(12) United States Patent
Potharaju et al.

(10) Patent No.: US 11,197,165 B2
(45) Date of Patent: Dec. 7, 2021

(54) AUTOMATED NEIGHBOR FREQUENCY PROVISIONING IN PRIVATE 3GPP NETWORKS

(71) Applicant: Cisco Technology, Inc., San Jose, CA (US)

(72) Inventors: Shailender Potharaju, Fremont, CA (US); Rajesh S. Pazhyannur, Fremont, CA (US); Ramesh Rayanki, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/715,803

(22) Filed: Dec. 16, 2019

(65) Prior Publication Data

US 2021/0185541 A1 Jun. 17, 2021

(51) Int. Cl.
| | | |
|---|---|---|
| *H04W 16/14* | (2009.01) | |
| *H04W 36/00* | (2009.01) | |
| *H04W 24/10* | (2009.01) | |
| *H04W 76/19* | (2018.01) | |
| *H04W 72/00* | (2009.01) | |
| *H04W 76/27* | (2018.01) | |
| *H04W 72/04* | (2009.01) | |

(52) U.S. Cl.
CPC .......... *H04W 16/14* (2013.01); *H04W 24/10* (2013.01); *H04W 36/00835* (2018.08); *H04W 72/005* (2013.01); *H04W 72/0453* (2013.01); *H04W 76/19* (2018.02); *H04W 76/27* (2018.02)

(58) Field of Classification Search
CPC ... H04W 16/14; H04W 72/005; H04W 76/19; H04W 76/27; H04W 24/10; H04W 36/00835; H04W 72/0453; H04W 36/0083; H04W 28/0808
See application file for complete search history.

(56) References Cited

U.S. PATENT DOCUMENTS

| | | | |
|---|---|---|---|
| 9,253,705 B1 * | 2/2016 | Pawar | H04W 36/0085 |
| 9,326,196 B1 | 4/2016 | Sitaram et al. | |
| 9,344,929 B2 | 5/2016 | Shetigar et al. | |
| 9,900,136 B2 | 2/2018 | Parkvall et al. | |
| 2004/0219905 A1 | 11/2004 | Blumenthal et al. | |
| 2009/0247159 A1 | 10/2009 | Flore et al. | |

(Continued)

*Primary Examiner* — Thai Nguyen
(74) *Attorney, Agent, or Firm* — Edell, Shapiro & Finnan, LLC

(57) ABSTRACT

A base station operative in a Citizens Broadband Radio Service (CBRS) band controlled according to a shared access system (SAS) may be configured for automated neighbor frequency provisioning. The base station may maintain an active neighbor list of small cell frequencies of active neighboring small cells, which is created or updated by performing a scanning operation and adding small cell frequencies of scanned neighboring small cells to the active neighbor list. The base station may receive, from an active neighboring base station having a connection established therewith, one or more messages including a neighbor list of small cell frequencies of neighboring small cells that neighbor the active neighboring small cell. At least some of the neighboring small cells of the active neighboring small cell may be added to the active neighbor list of the base station based on signal strength of user equipment (UE) measurements.

20 Claims, 14 Drawing Sheets

(56) References Cited

U.S. PATENT DOCUMENTS

| | | |
|---|---|---|
| 2011/0310791 A1 | 12/2011 | Prakash et al. |
| 2012/0100884 A1 | 4/2012 | Radulescu et al. |
| 2013/0183971 A1* | 7/2013 | Tamaki ............. H04W 36/0061 455/436 |
| 2015/0201337 A1 | 7/2015 | Hwang et al. |
| 2015/0271714 A1 | 9/2015 | Shetigar |
| 2015/0365855 A1* | 12/2015 | Nuss .................... H04W 24/02 455/444 |
| 2016/0112911 A1 | 4/2016 | Drazynski et al. |

\* cited by examiner

AUTOMATED NEIGHBOR FREQUENCY PROVISIONING IN PRIVATE 3GPP NETWORKS

TECHNICAL FIELD

The present disclosure relates generally to communications in mobile networks, and more particularly to automated neighbor frequency provisioning in Third Generation Partnership Project (3GPP) networks, such as Citizens Broadband Radio Service (CBRS) private 3GPP networks.

BACKGROUND

A user equipment (UE) may include a Third Generation Partnership Project (3GPP) radio transceiver for communication in a public 3GPP ("cellular") network and a non-Third Generation Partnership Project (non-3GPP) radio transceiver for communication in a local private non-3GPP wireless network. The public 3GPP network may be, for example, a Fourth Generation (4G)/Long Term Evolution (LTE) based network, and the non-3GPP wireless network may be an Institute of Electrical and Electronics Engineers (IEEE) 802.11 compliant wireless local area network (WLAN).

Typically, an enterprise utilizes a local private WLAN (e.g. an enterprise Wi-Fi network) to provide wireless communication for UEs on enterprise premises. Looking ahead, an enterprise may additionally utilize a local private 3GPP network operative in a shared spectrum, such as a Citizens Broadcast Radio Services (CBRS) band. Spectrum sharing in a CBRS network is facilitated by a spectrum access system (SAS) which is configured to authorize and manage the use of spectrum of CBRS base stations (or Citizens Broadband Radio Service Devices "CBSDs") across different CBRS networks.

Private LTE network deployments operating in CBRS are typically based on the same backend service core as traditional LTE deployments. Here, subscriber access to packet core services may be made through a 3GPP-defined Evolved Packet Core (EPC). Core network functions of the EPC may include a Mobility Management Entity (MME), a Policy and Charging Rules Function (PCRF), a Packet Data Network Gateway (PGW), and a Serving Gateway (SGW).

Traditionally, frequencies available within a system are known during network deployment. In such a system, each base station or eNodeB (eNB) may be assigned with a channel and the proper set of neighbor channels in advance. An eNB may use this neighbor channel information to inform UEs of their neighbors (e.g. neighbor frequency and identifier), using either broadcast or dedicated configuration procedures.

In a CBRS-based system, however, channel assignment is dynamic. Here, each CBSD deployed in a network may potentially receive a specific channel assignment by the SAS. At any time, an operating channel of an eNB may be revoked and a new channel assigned. Also in CBRS, the shared spectrum is 150 MHz wide. If the channel assignment is either 10 MHz or 20 MHz, it is possible that up to thirty-one (31) channels exist in the network.

As is apparent, there are deployment-related challenges that arise with use of CBRS. As neighbor channel allocation in CBRS is dynamic, one question that arises relates to which neighboring cells should be sent to UEs. If a traditional approach is used, a CBSD may "blindly" inform UEs with most or all possible channels (e.g. up to 31 channels) as neighboring frequencies. Here, each UE may spend much or most of its time scanning each frequency to discover potential target CBSDs, which would lower user-throughput and take a toll on UE battery life. Also, a UE may discover a neighboring CBSD which is too far or sub-optimal to be used as a potential target CBSD.

Thus, CBRS in the enterprise introduces new challenges to existing automatic neighbor relation (ANR). Unlike with traditional licensed cells, channel selection in today's indoor venues may result in selection of any channel in the 150 MHz band. Such a selection can give rise to a potentially very large number of frequencies in the neighbor list. In combination with "missing" or "hidden" neighbors, a frequent occurrence in many indoor environments, this makes a solution to use of CBRS very challenging.

DESCRIPTION OF EXAMPLE EMBODIMENTS

Figure 1:
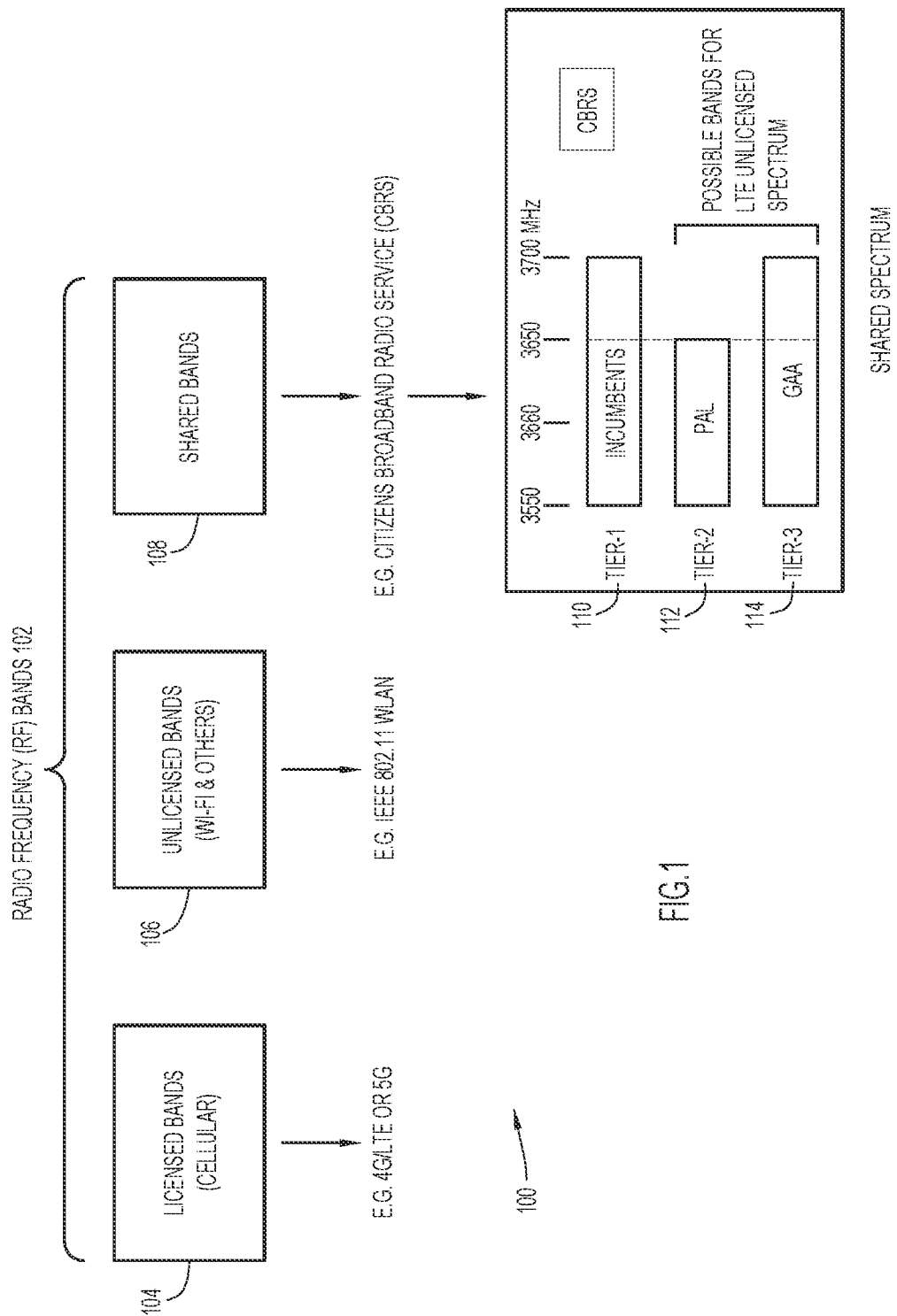
FIG. 1 is a reference diagram for describing radio frequency (RF) bands used for radio communications for mobile devices or user equipments (UEs)

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Techniques and mechanisms of the present disclosure may be for use by one or more base stations for automated neighbor frequency provisioning. The automated frequency provisioning may be used in association with an automatic neighbor relation (ANR) function of a base station and, more generally, as part of a self-configuring or self-organizing network (SON). In preferred implementations, the base station may be a Third Generation Partnership Project (3GPP) base station operative in a shared spectrum according to a system for shared spectrum access and, in particular, a private 3GPP base station operative in a Citizens Broadband Radio Service (CBRS) band controlled according to a spectrum access system (SAS), referred to as a Citizens Broadband Radio Service Device or "CBSD."

In some implementations, a 3GPP base station (e.g. CBSD) or controller thereof may maintain an active neighbor list of small cell frequencies of active neighboring small cells that neighbor a small cell served by the 3GPP base station. The 3GPP base station may broadcast, to one or more user equipments (UEs) operative in the small cell, a system information message including at least some of the small cell frequencies of the active neighboring small cells in the active neighbor list.

The active neighbor list of small cell frequencies of active neighboring small cells may be created or updated with use of a procedure. The procedure may include a scanning procedure for performing one or more scanning operations for generating a scan list of small cell frequencies of scanned neighboring small cells of the small cell, and adding at least some of the small cell frequencies of the scanned neighboring small cells of the scan list to the active neighbor list of small cell frequencies of active neighboring small cells of the small cell.

The procedure may also include a discovery procedure which involves populating a potential neighbor list with small cell frequencies of "likely" potential neighboring small cells. After population of the potential neighbor list with small cell frequencies of the potential neighboring small cells, the discovery procedure may involve adding, to the active neighbor list of small cell frequencies of active neighboring small cells, at least some of the small cell frequencies of the potential neighboring small cells in the potential neighbor list that are not included in the active neighbor list and are associated with UE measurements that fall within a set of strongest UE measurements. To obtain such UE measurements, the 3GPP base station may transmit, to one or more UEs operative in the small cell, a message including at least some of the small cell frequencies of the potential neighboring small cells in the potential neighbor list, and in response receiving a message including a report of the UE measurements of the potential neighboring small cells.

In some implementations, the potential neighbor list may be populated by receiving, from an active neighboring 3GPP base station having a connection established therewith, one or more messages including a neighbor list of small cell frequencies of neighboring small cells that neighbor the active neighboring small cell served by the active neighboring 3GPP base station; and adding at least some of the small cell frequencies of the neighboring small cells of the neighbor list of the active neighboring 3GPP base station to the potential neighbor list of small cell frequencies of potential neighboring small cells. This population procedure may be performed for each one of at least some (or most or all) of the active neighboring small cells in the active neighbor list of the 3GPP base station. As described above, at least some of the small cell frequencies of the potential neighboring small cells in the potential neighbor list, not included in the active neighbor list and associated with UE measurements that fall within a set of strongest UE measurements, may be added to the active neighbor list of small cell frequencies of active neighboring small cells.

In some further implementations, the potential neighbor list may be populated by identifying, after a radio link failure (RLF) associated with a UE, a small cell frequency of a new serving cell for a re-established connection of the UE. The 3GPP base station or controller thereof may add the small cell frequency of the new serving cell to the potential neighbor list of small cell frequencies of potential neighboring small cells of the small cell. This population procedure may be performed for each one of a plurality of UEs over a period of time. Again as described above, at least some of the small cell frequencies of the potential neighboring small cells in the potential neighbor list, not included in the active neighbor list and associated with UE measurements that fall within a set of strongest UE measurements, may be added to the active neighbor list of small cell frequencies of active neighboring small cells.

More detailed and alternative techniques and implementations are provided herein as described below.

EXAMPLE EMBODIMENTS

As described in the Background section, a user equipment (UE) may include a Third Generation Partnership Project (3GPP) radio transceiver for communication in a public 3GPP ("cellular") network and a non-Third Generation Partnership Project (non-3GPP) radio transceiver for communication in a local private non-3GPP wireless network. The public 3GPP network may be, for example, a Fourth Generation (4G)/Long Term Evolution (LTE) based network, and the non-3GPP wireless network may be an Institute of Electrical and Electronics Engineers (IEEE) 802.11 compliant wireless local area network (WLAN).

Typically, an enterprise utilizes a local private WLAN (e.g. an enterprise Wi-Fi network) to provide wireless communication for UEs on enterprise premises. Looking ahead, an enterprise may additionally utilize a local private 3GPP network operative in a shared spectrum, such as a Citizens Broadcast Radio Services (CBRS) band. Spectrum sharing in a CBRS network is facilitated by a spectrum access system (SAS) which is configured to authorize and manage the use of spectrum of CBRS base stations (or Citizens Broadband Radio Service Devices "CBSDs") across different CBRS networks.

Private LTE network deployments operating in CBRS are typically based on the same backend service core as traditional LTE deployments. Here, subscriber access to packet core services may be made through a 3GPP-defined Evolved Packet Core (EPC). Core network functions of the EPC may include a Mobility Management Entity (MME), a Policy and Charging Rules Function (PCRF), a Packet Data Network Gateway (PGW), and a Serving Gateway (SGW).

Traditionally, frequencies available within a system are known during network deployment. In such a system, each base station or eNodeB (eNB) may be assigned with a channel and the proper set of neighbor channels in advance. An eNB may use this neighbor channel information to inform UEs of their neighbors (e.g. neighbor frequency and identifier), using either broadcast or dedicated configuration procedures. In a CBRS-based system, however, channel assignment is dynamic. Here, each CBSD deployed in a network may potentially receive a specific channel assignment by the SAS. At any time, an operating channel of an eNB may be revoked and a new channel assigned. Also in CBRS, the shared spectrum is 150 MHz wide. If the channel assignment is either 10 MHz or 20 MHz, it is possible that up to thirty-one (31) channels exist in the network.

As is apparent, there are deployment-related challenges that arise with use of CBRS. As neighbor channel allocation in CBRS is dynamic, one question that arises relates to which neighboring cells should be sent to UEs. If a traditional approach is used, a CBSD may "blindly" inform UEs with most or all possible channels (e.g. up to 31 channels) as neighboring frequencies. Here, each UE may spend much or most of its time scanning each frequency to discover potential target CBSDs, which would lower user-throughput and take a toll on UE battery life. Also, a UE may discover a neighboring CBSD which is too far or sub-optimal to be used as a potential target CBSD.

Thus, CBRS in the enterprise introduces new challenges to existing automatic neighbor relation (ANR). Unlike with traditional licensed cells, channel selection in today's indoor venues may result in selection of any channel in the 150 MHz band. Such a selection can give rise to a potentially very large number of frequencies in the active neighbor list. In combination with "missing" or "hidden" neighbors, a frequent occurrence in many indoor environments, this makes a solution to use of CBRS very challenging.

According to at least some techniques and mechanisms of the present disclosure, one or more network scans of a CBSD may be utilized for initial neighbor detection, followed by the use of neighbors discovered from X2 neighbors, as well as those discovered from UE neighbor scans. According to some implementations, network scans of a CBSD may be enhanced with use of one or more sources: neighbor lists of X2 neighbors; UE neighbor scans, and/or new serving cells of UEs detected in response to radio link failures (RLFs).

In some preferred implementations, a procedure may be performed by a 3 GPP base station or CBSD based on the following:

1. Network Scanning. Initially, a CBSD which serves a small cell may discover neighboring small cells of the small cell with use of a network scan, rediscovering them if channel assignments change. The CBSD may run the network scan to listen on each possible frequency to detect neighboring small cells. Each CBSD may establish an X2 connection with its discovered neighboring small cells. The CBSD may maintain an active neighbor list of active neighboring small cells of the small cell, populating the active neighbor list with the discovered neighboring small cells having established X2 connections. The discovered neighbors may become part of active neighbor list to put in the broadcasted neighbor list. The network scan for populating the active neighbor list may be performed during initial startup, periodically, and/or in response to a detected change in channel assignment.

2. Neighbors of X2 neighbors. Each CBSD may exchange active neighbor lists with its X2 neighbors. Thus, a CBSD may receive one or more neighbor lists from one or more of its X2 neighbors. This information is used to populate a potential neighbor list. The potential neighbor list may contain neighbors of X2 neighbors, but not those in the serving CBSD's active neighbor list. The frequencies in the potential neighbor list are not (e.g. immediately) included in broadcast messages, but rather may be provided selectively to UEs for scanning. If one or more UEs report measurements on these small cell frequencies, then these frequencies may be moved from the potential neighbor list to the active neighbor list for broadcasting to UEs.

3. UE Neighbor Scan. Any small cell frequencies that are not in lists created or described in relation to approaches 1 and 2 above, may be also be proactively provided to selected UEs for neighbor scanning. This scanning may be performed to locate any "hidden" neighbors of the serving CBSD that do not share an X2 connection with the CBSD's neighbor. If one of more UEs report measurements on these small cell frequencies, then the frequencies may be moved from potential neighbor list to the active neighbor list for broadcasting to UEs.

4. UE RLF. If a UE has a RLF and re-attaches immediately to another small cell in the network, then an external system (e.g. like a centralized self-organized network or "SON") may detect whether the newly attached small cell is in CBSD's active neighbor list or not. If it is not in the active neighbor list, then the small cell is added to the potential neighbor list.

5. As described, the neighbor channel information may be built based on approaches 1 and 2 above. However, this active neighbor list may be relatively large and may not optimal for every UE. In some implementations, the CBSD may identify a set of relatively strong neighbors from its scan reports. These strong neighbors may be added to the active neighbor list for broadcasting to UEs. In addition, the CBSD may request one or more surrounding available UEs to scan the rest of the CBSD, in a manner that does not adversely affect UE performance. The CBSD may thereby identify a set of relatively strong neighbors for each UE from its scan measurement reports. Further, the CBSD may create a radio frequency (RF) map based on each UE report, including its path loss from the CBSD and relatively strong neighbors around it. Over a period of time, a complete RF map around the CBSD will be built. Once this learning is complete, a suitable set of neighbors for a new UE may be identified and utilized based on the RF map.

As the active neighbor list may become large, neighbors in the active neighbor list may be separated into a first set which are broadcast and a second set which are unicast. Here, unicasting for UE scanning may be performed with use of a Radio Resource Control (RRC) connection reconfiguration message. Thus, in some implementations, the "unicast" neighbor list may be used for UE scanning and the "broadcast" neighbor list may be used for broadcasting to UEs. Put another way, a CBSD may provide a first set of neighbors (based on strongest signal strength or received signal strength indicator "RSSI") to a UE via the RRC and provide a second set of (remaining) neighbors for broadcasting. This has benefit of reducing scanning time, on average, for a UE. In some further implementations, the CBSD may maintain a counter of the number of handovers for UEs on a frequency basis. Seldom used frequencies or unused frequencies (e.g. less than a threshold value) may be eliminated after a period of time.

To better illustrate the techniques and mechanisms in relation to the drawings, FIG. 1 is a reference diagram 100 for describing RF bands 102 used for radio communications for UEs. RF bands 102 may include licensed bands 104 for 3GPP or macro-cellular networks (e.g. 4G/LTE or Fifth Generation "5G" networks), unlicensed bands 106 for non-3GPP or Wi-Fi networks (e.g. IEEE 802.11 WLANs), and shared bands 108 (e.g. for CBRS).

CBRS provides for use of a 150 MHz-wide broadcast band in the 3550-3700 MHz frequency range, i.e. Time Division (TD) LTE (TD-LTE) band "48." There are three types of users allowed to access this spectrum, including incumbent users, Priority Access License (PAL) users, and General Authorized Access (GAA) users. The SAS serves to protect incumbents from interference from lower-tier PAL and GAA users, and protects PAL users from interference from other PAL and GAA users. The SAS maintains database information of spectrum usage by incumbent, PAL, and GAA users in all census tracts (or areas) and allocates channels to base stations (or CBSDs) according to a variety of rules.

For example, a Tier-1 type 110 or incumbent users (such as navy ships, military radars and fixed satellite service earth stations) are allocated access to all the channels. A Tier-2 type 112 or PAL users are granted access in the 3550-3650 MHz band and are allowed to use a maximum of seven (7) 10 MHz channels in a census tract (or area). Here, no licensee is allowed to take more than four (4) PAL channels in a census tract. A Tier-3 type 114 or GAA users are allowed access to all the channels, but only channels that are not being used by the other above-indicated users. A SAS makes determinations based on multiple factors and informs CBSDs of allowable operating parameters (e.g. frequency band or channel and maximum Effective Isotropic Radiated Power or "EIRP") that it can use at a given point of time, to ensure compliance with regulations with the Federal Communications Commission (FCC) and other regulatory bodies.

In some implementations of the present disclosure, the techniques and mechanisms may be provided for in a local private 3GPP network operating in a shared spectrum. The shared spectrum may be the CBRS band, which is controlled according to a SAS configured to authorize and manage use of the CBRS band across different CBRS networks. For example, a private LTE network operating in CBRS may be based on the same backend service core as a traditional LTE deployment. Here, subscriber access to packet core services may be made through the 3GPP-defined EPC, which may include core network functions such as an MME, a PCRF, a PGW, and a SGW.

Figure 2:
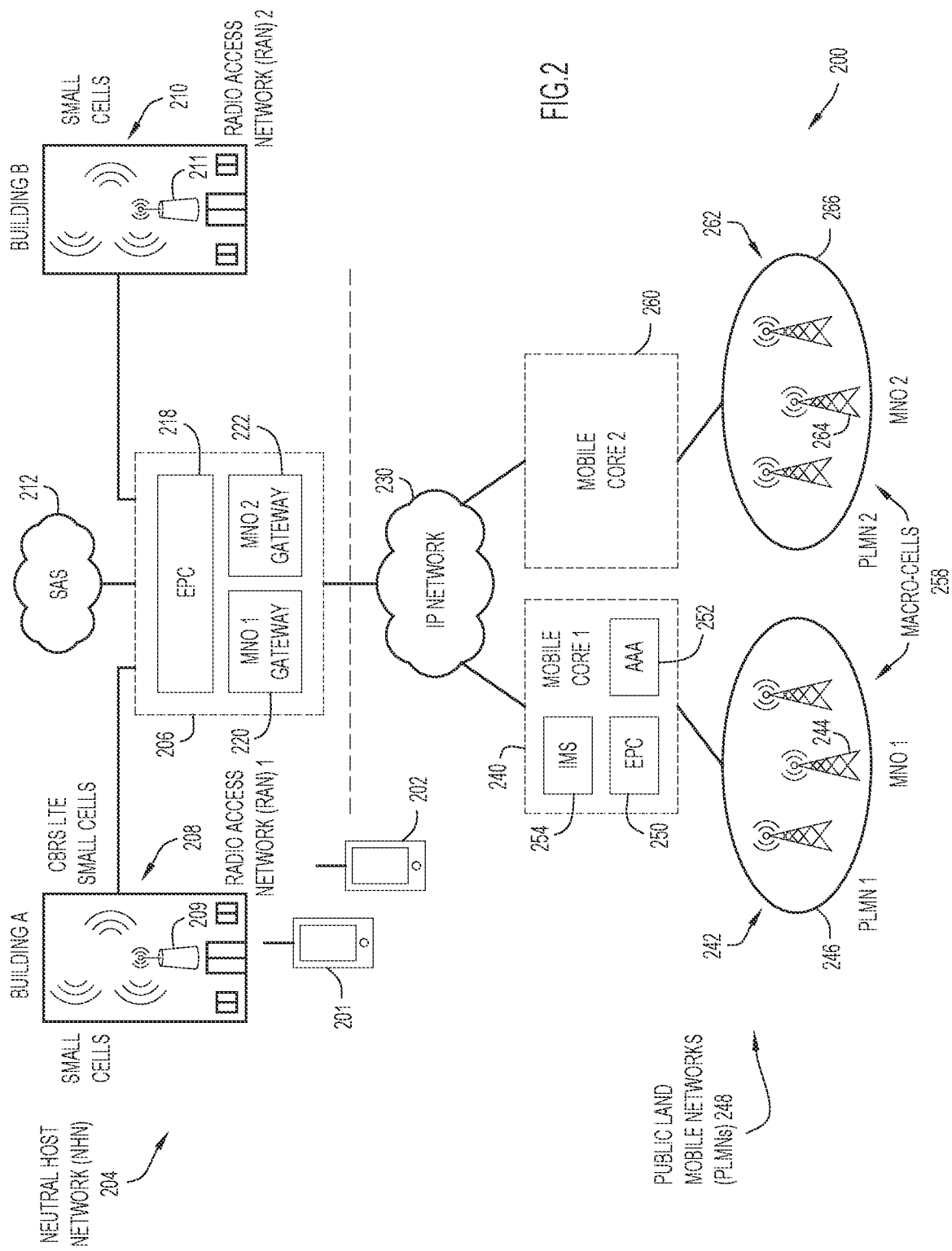
FIG. 2 is an illustrative representation of an example communication environment for UEs, and more particularly, an example communication system which includes a plurality of Public Land Mobile Networks (PLMNs) (or macro-cellular networks) associated with a plurality of Mobile Network Operators (MNOs), and a Neutral Host Network (NHN) including one or more Radio Access Networks (RANs) for shared access by the MNOs via a Multi-Operator Core Network (MOCN)

In some particular implementations, techniques and mechanisms of the present disclosure may be provided for in a Radio Access Network (RAN) of a Neutral Host Network (NHN). Accordingly, FIG. 2 is an illustrative representation of a communication system 200 which includes a plurality of PLMNs 248 (or macro-cellular networks) associated with a plurality of MNOs, and an NHN 204 including one or more RANs for shared access by the MNOs via a multi-operator core network (MOCN). As described below, each RAN may provide communications in a plurality of small cells served by a plurality of base stations.

In the example of FIG. 2, the plurality of PLMNs 248 include a PLMN 1 of an MNO 1 and a PLMN 2 of an MNO 2. PLMN 1 of MNO 1 may be identified by a PLMN ID 1 and PLMN 2 of MNO 2 may be identified by a PLMN ID 2. In general, the plurality of PLMNs 248 provide for communications in a plurality of macro-cells 258. Each one of PLMNs 248 (i.e. PLMN 1 and PLMN 2) may include a mobile core and one or more base stations (e.g. operative in licensed spectrum). For example, PLMN 1 of MNO 1 may include a mobile core 240 and one or more base stations 242, such as a base station 244 providing communications in a macro-cell 246. Similarly, PLMN 2 of MNO 2 may include a mobile core 260 and one or more base stations 262, such as a base station 264 providing communications in a macro-cell 266. Although not illustrated in FIG. 2, macro-cells 258 of PLMNs 1 and 2 may be overlapping or adjacent to each other; for example, macro-cell 246 of PLMN 1 may overlap with or be adjacent to macro-cell 266 of PLMN 2 (see e.g. FIGS. 5A-5C described later below).

Mobile core 240 of MNO 1 may include EPC 250 or other suitable core network technology, an Authentication, Authorization, and Accounting (AAA) server 252 (e.g. a Remote Authentication Dial-In User Service or "RADIUS" server) for authentication, and an IP Multimedia Subsystem (IMS) 254, as well as other core components. Mobile core 260 of MNO 2 may be configured similarly or the same as mobile core 240 of MNO 1. The base stations configured to serve macro-cells 258 may be or include, for example, eNBs, gNodeBs (gNBs), and the like. These base stations may further include or be associated with controller and/or processing portions, for example, baseband units (BBUs), control units (CUs), CU user planes (CU-Us), etc., for operation and control.

Each RAN of NHN 204 may provide communications in a plurality of small cells, being a shared resource with shared access by the MNOs via the MOCN. In the example of FIG. 2, the RANs of NHN 204 include a RAN 1 providing communications in a plurality of small cells 208 in a Building A (e.g. an office building), and a RAN 2 providing communications a plurality of small cells 210 in a Building B (e.g. another office building). The plurality of small cells 208 of RAN 1 may be served by a plurality of base stations (e.g. a 3GPP base station 209) (alternatively referred to as an access point or "AP"), and similarly, the plurality of small cells 210 of RAN 2 may be served by a plurality of base stations (e.g. a 3GPP base station 211). The base stations configured to serve the small cells may be or include, for example, eNBs, gNBs, Home eNBs (HeNBs), Remote Radio Heads (RRHs), and the like. These base stations may include or be associated with processing and control portions, for example, CUs, CU-Us, etc., for control and communications.

In general, "small cell" networks differ from "macro-cell" networks in that small cell networks are typically comprised of multiple small cell base stations or APs, which may provide proximate coverage to users in an environment in which macro-cellular network coverage may be limited or interfered (e.g. within a building, structure, facility, etc.). Typically, radios of small cell networks operate at lower RF power levels as compared to radios of macro-cell networks, for example, to provide coverage in a business or residential environment (e.g. within a building, home, etc.) where coverage from macro-cell radios may be limited due to interference from walls, roofs, etc. Each cell may be identified using a corresponding cell identifier (cell ID). In various embodiments, the cell ID may be a Cell Global Identifier (CGI), an E-UTRAN CGI (eCGI) (i.e. for Evolved-Universal Mobile Telecommunications Service "UMTS" Terrestrial Radio Access Network or "E-UTRAN"), or some other identifier, which may uniquely identify a cell.

RAN 1 and RAN 2 may provide operation for communication in a shared spectrum according to a system for shared spectrum access. Accordingly, a SAS 212 utilized by NHN 204 may be configured to authorize and manage the use of spectrum of the base stations of the small cells 208 of RAN 1 and small cells 210 of RAN 2. SAS 212 makes spectrum allocation determinations based on a variety of factors and informs the base stations of allowable operating parameters (e.g. frequency channel and EIRP) for communications.

Each one of base stations in RAN 1 and RAN 2 may have an interface for communications with a core network 206 of NHN 204. Core network 206 may be or be based on an EPC 218 or other suitable core network technology. Core network 206 of NHN 204 may include a plurality of gateways to provide shared access for the MNOs via a public or private network (e.g. an IP network 230). For example, core network 206 of NHN 204 may include an MNO 1 gateway 220 for access by functions of mobile core 240 of PLMN 1 of MNO 1, as well as an MNO 2 gateway 222 for access by functions of mobile core 260 of PLMN 2 of MNO 2.

In some implementations, a UE 201 may have a subscription for service with MNO 1 and be associated with PLMN ID 1. UE 201 may operate for communications in RAN 1 of NHN 204 and be subsequently moved out of coverage of RAN 1, being handed over to one of PLMNs 248 associated with MNO 1/PLMN 1. On the other hand, a UE 202 may have a subscription for service with MNO 2 and be associated with PLMN ID 2. UE 202 may operate for communications in RAN 1 of NHN 204 and be subsequently moved out of coverage of RAN 1, being handed over to one of PLMNs 248 associated with MNO 2/PLMN 2.

In some implementations, techniques and mechanisms of the present disclosure relate to processing and/or communication of a 3GPP base station for automated neighbor frequency provisioning in private 3GPP networks, such as CBRS private LTE networks. The automated frequency provisioning may be used in association with an ANR function of a 3GPP base station (e.g. a CBSD) and, more generally, as part of a self-configuring network or SON.

Figure 3:
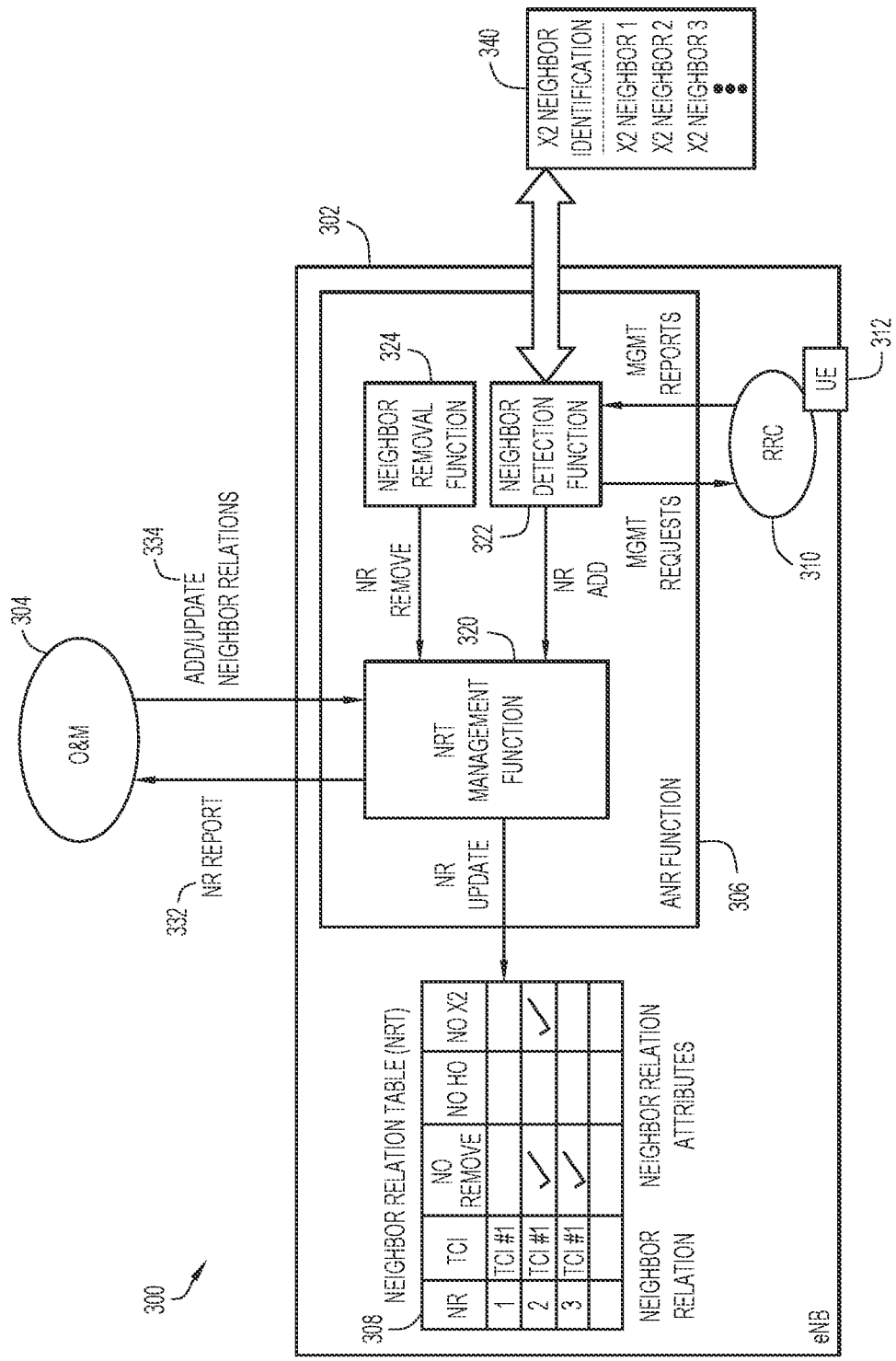
FIG. 3 is an illustrative representation of a Third Generation Partnership Project (3GPP) base station (e.g. an eNodeB or "eNB") having an automatic neighbor relation (ANR) function for generation of a neighbor relation table (NRT), which may be used in some implementations, and which may be a private 3GPP base station operative in a shared spectrum according to a system for shared spectrum access.

FIG. 3 is an illustrative representation 300 of a 3GPP base station 302 (e.g. an eNodeB or "eNB") having an ANR function 306 for generating a neighbor relation table (NRT) 308 which may be used in some implementations. ANR function 306 is generally provided to relieve an operator from the burden of manually managing neighbor relations (NRs).

ANR function 306 may include an NRT management function 320 which may create and provide updates to NRT 308. NRT 308 may have a list of entries corresponding to neighbors of 3GPP base station 302. NRT 308 may include neighbor relations and attributes of the neighbor relations. In some implementations, the neighbor relations of NRT 308 may include a Target Cell Identifier (TCI), and the neighbor relation attributes of NRT 308 may include a "NoRemove" attribute, a "NoHO" attribute, and a "NoX2" attribute. For E-UTRAN, the TCI corresponds to the eCGI and Physical Cell Identifier (PCI) of the target cell. The NoRemove attribute indicates whether the eNB shall not remove the neighbor cell relation from NRT 308. The NoHO attribute indicates whether the neighbor cell relation shall not be used by the eNB for handover purposes. The NoX2 attribute indicates whether the neighbor relation shall not use an X2 interface in order to initiate procedures towards the eNB parenting a target cell.

NRT management function 320 which may interface with a neighbor detection function 322 for detecting and adding neighbors and a neighbor removal function 324 for removing neighbors. Neighbor detection function 322 may be able to detect neighbors at least in part from requesting and receiving UE measurement reports from one or more UEs 312 via an RRC function 310. NRT management function 320 may further interface with an operations and maintenance (O&M) 304 for information. For example, NRT management function 320 may provide NR reports to O&M 304 (a messaging 332 of FIG. 3) and receive from O&M 304 additions or updates to neighbor relations (a messaging 334 of FIG. 3).

In LTE, an X2 control plane (CP) external interface (X2-CP) is defined between two neighboring eNBs. The transport network layer is built on Stream Control Transmission Protocol (SCTP) on top of Internet Protocol (IP). The application layer signaling protocol may be referred to as X2-AP ("Application Protocol"). In some implementations, neighbor detection function 322 of FIG. 3 may be able to identify potential neighbors via an X2 neighbor identification function 340, by receiving neighbor lists of neighboring small cells served by neighboring 3GPP base stations to which X2 connections have been established. These potential neighbors may be further detected with use of neighbor detection function 322 for requesting and receiving the UE measurement reports from the one or more UEs 312 via RRC function 310. In some implementations, an active neighbor list of small cell frequencies of active neighboring small cells of 3GPP base station 302 may be associated with NRT 308 of 3GPP base station 302, and a neighbor list of small cell frequencies of neighboring small cells of a neighboring 3GPP base station (e.g. having an X2 connection with 3GPP base station 302) may be associated with a neighboring NRT of the neighboring 3GPP base station.

Figure 4:
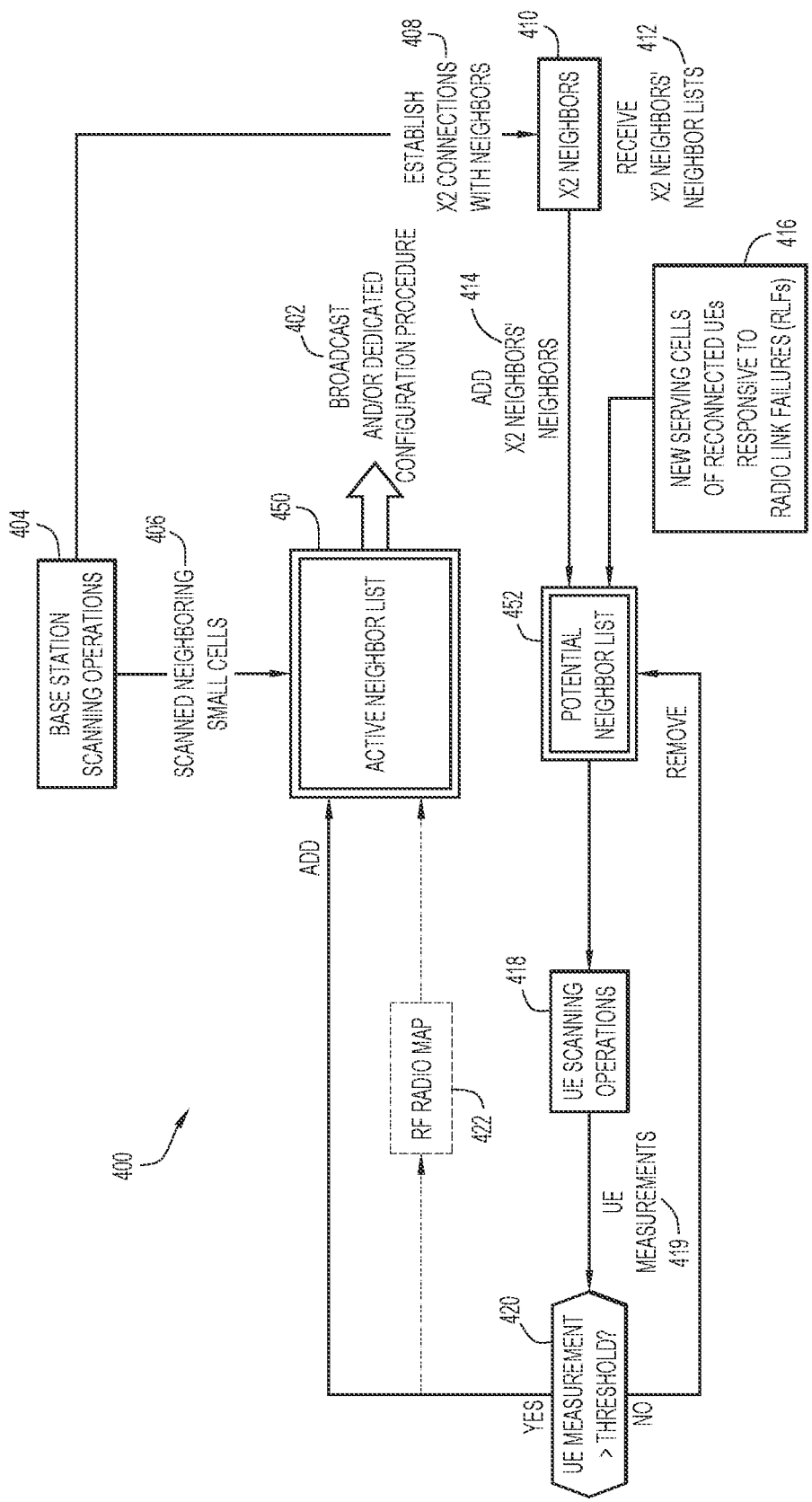
FIG. 4 is a process flow diagram for describing processing associated with automated neighbor frequency provisioning in a 3GPP base station according to some implementations of the present disclosure.

FIG. 4 is a process flow diagram 400 for describing processing associated with automated neighbor frequency provisioning in a 3GPP base station according to some implementations of the present disclosure. In general, the 3GPP base station may maintain an active neighbor list 450 of small cell frequencies of active neighboring small cells that neighbor a small cell served by the 3GPP base station. In some implementations, the 3GPP base station may broadcast, to one or more UEs operative in the small cell, a system information message including at least some of the small cell frequencies of the active neighboring small cells in the active neighbor list (a process 402). Accordingly, the UE(s) may receive the system information messages, perform measurements on signals from neighboring small cells based on the neighbor lists, and report these measurements to the 3GPP base station which determines whether to handover the UE and to which cell to handover.

Active neighbor list 450 may be created initially by performing one or more network or base station scanning operations in one or more RF bands (e.g. CBRS) (a process 404). The one or more scanning operations may be performed for generating a scan list of small cell frequencies of scanned neighboring small cells 406 of the small cell. Small cell frequencies of at least some of scanned neighboring small cells 406 may be added to active neighbor list 450 of small cell frequencies of the active neighboring small cells.

These (initial) active neighboring small cells are served by active neighboring 3GPP base stations. The 3GPP base station may establish connections or X2 connections with each one of these (initial) active neighboring 3GPP base stations (a process 408). Accordingly, the 3GPP base station may maintain information associated with its initially-established X2 neighbors (a process 410).

For each one of these active neighboring 3GPP base stations, the 3GPP base station may receive, from an active neighboring 3GPP base station, one or more messages including the active neighbor list of small cell frequencies of neighboring small cells of the active neighboring 3GPP base station (a process 412). At least some of the small cell frequencies of the neighboring small cells of the active neighboring 3GPP base stations may be added to a potential neighbor list 452 of small cell frequencies of potential neighboring small cells of the 3GPP base station (a process 414). Notably, at least some of the small cell frequencies of the potential neighboring small cells in potential neighbor list 452 that are not included in its active neighbor list 450 and are associated with UE measurements 419 from UE scanning operations (a process 418) that fall within a set of strongest UE measurements may be added to active neighbor list 450.

Further, after a UE experiences an RLF, the UE may re-establish a connection via a new serving cell and, in response, a small cell frequency of the new serving cell may be added to potential neighbor list 452 (a process 416). Again, at least some of the small cell frequencies of the potential neighboring small cells in potential neighbor list 452 that are not included in its active neighbor list 450 and are associated with UE measurements 419 from UE scanning operations (again process 418) that fall within a set of strongest UE measurements may be added to active neighbor list 450.

For obtaining UE measurements 419, the 3GPP base station may transmit, to one or more UEs operative in the small cell, a message including at least some of the small cell frequencies of the potential neighboring small cells in potential neighbor list 452. The one or more UEs may then perform the UE scanning operations (again, process 418). In response, the 3GPP base station may receive a message including a report of UE measurements 419 of the potential neighboring small cells in potential neighbor list 452. For identifying the set of strongest UE measurements, UE measurements 419 may be compared to one or more threshold values (whether fixed or relative/variable threshold values) (a process 420). Small cell frequencies of potential neighboring small cells in potential neighbor list 452 that are relatively weak may be removed ("No" at 420). Note that the processing in FIG. 4 may be performed regularly, periodically, or in response to a change in channel assignment according to the system for shared spectrum access.

Active neighbor list 450 may be further created or updated based on an RF map 422 of the small cell which may be generated by the 3GPP base station. RF map 422 of the small cell may be made or constructed based on a plurality of RF map portions associated with a plurality of UEs. Here, the 3GPP base station may transmit, to a UE operative in the small cell, a message including at least some of the list of small cell frequencies of potential neighboring small cells. In response, the 3GPP base station may receive a message including a report of UE measurements of the potential neighboring small cells. The 3GPP base station may create a respective one of the RF map portions of RF map 422 based on the report of the UE measurements of the potential neighboring small cells, as well path loss and other factors. This process may be repeated, that is, the transmitting and the creating may be repeated for each UE of the plurality of UEs operative in the small cell. The active neighbor list which has been created or updated in this manner may be used by subsequent UEs operative in the small cell.

Figure 5:
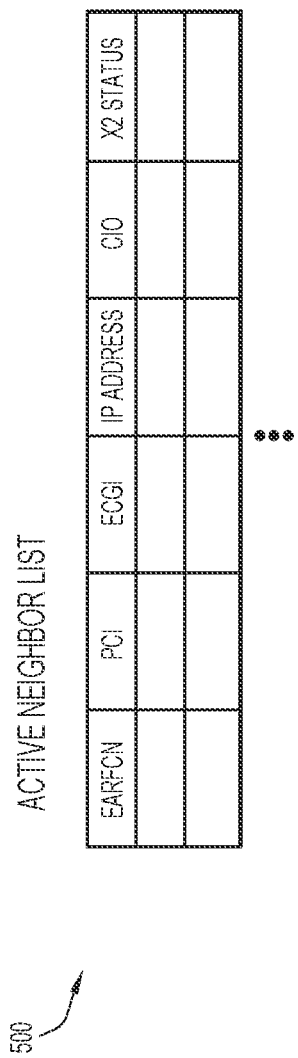
FIG. 5 is an illustrative representation of an example of an active neighbor list of small cell frequencies of active neighboring small cells according to some implementations.

FIG. 5 is an illustrative representation of an example of an active neighbor list 500 of small cell frequencies of active neighboring small cells according to some implementations. In some implementations, this active neighbor list 500 of small cell frequencies may be common to all UEs in the small cell. Each entry in active neighbor list 500 of small cell frequencies may include a frequency channel number of a neighboring small cell and an identifier of the neighboring small cell. In some implementations as further indicated in FIG. 5, each entry may include one or more of a PCI of the neighboring small cell, a CGI or eCGI of the neighboring small cell, an IP address associated with the neighboring small cell, a Cell Individual Offset (or "CIO") of the neighboring small cell, and an X2 connection status indicator associated with the neighboring small cell. In CBRS/LTE, the frequency channel number may be an E-UTRA ("Evolved Universal Terrestrial Radio Access") Absolute Radio Frequency Channel Number or "EARFCN," where E-UTRA refers to Evolved Universal Mobile Telecommunications System or "UMTS" Terrestrial Radio Access. In LTE, the carrier frequency in the uplink and downlink may be designated by the EARFCN, which ranges between 0-65535.

Note that, in CBRS private LTE networks, access stratum (AS) protocols may run between an eNB and a UE, and these protocols may determine which radio-specific procedures are in effect. Specifically, an RRC state of the UE may determine operation and behavior associated with the UE. There are two different RRC states in LTE, namely, RRC IDLE and RRC CONNECTED, referred to as an idle mode and a connected mode, respectively. In the connected mode, a radio bearer is established with the eNB; in the idle mode, no radio bearer is established with the eNB. In the connected mode, the network is aware of the UE's location (i.e. the eNB) and therefore unicast communication is possible. Here, the UE may perform measurements on signals from neighboring cells (based on one or more active neighbor lists) and report these measurements to the eNB. The eNB may determine whether to handover the UE and to which cell to handover.

Figure 6A:
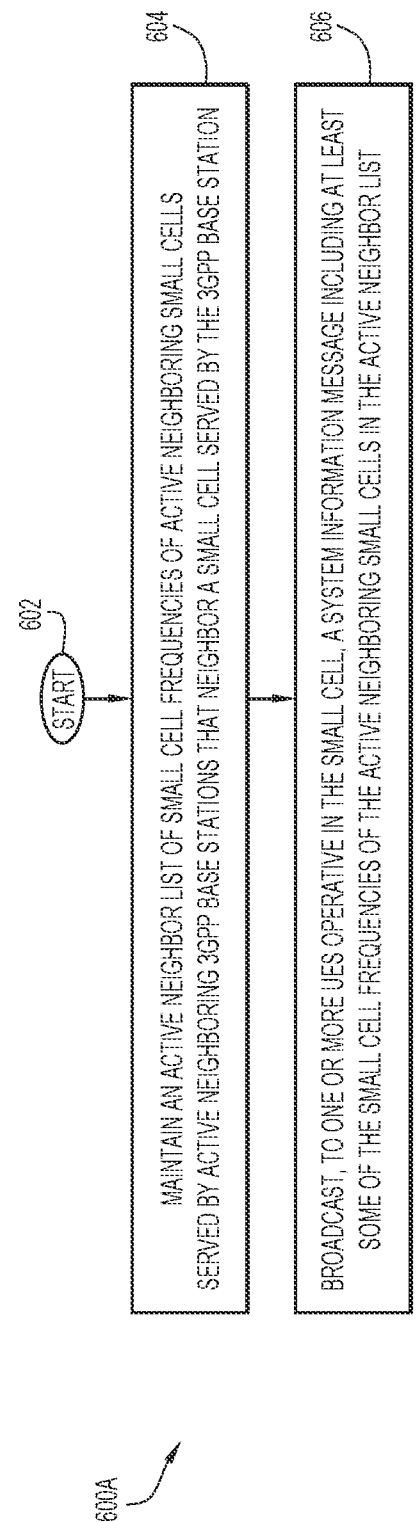
FIGS. 6A and 6B are flowcharts for describing methods of a 3GPP base station for providing small cell frequencies of active neighboring small cells to UEs according to some implementations of the present disclosure.

FIG. 6A is a flowchart 600A for describing a method of a base station for providing small cell frequencies of active neighboring small cells to UEs according to some implementations of the present disclosure. In particular, the method may be performed by a 3GPP base station (or controller or control unit thereof) operative in a shared spectrum according to a system for shared spectrum access. The method may be performed by each one of the 3GPP base stations in the mobile network. In some implementations, the base station may be a CBSD operative in a shared spectrum according to a SAS. The method may be embodied in a computer program product which includes a non-transitory computer readable medium and instructions stored in the non-transitory computer readable medium, where the instructions are executable by one or more controllers or processors of the 3GPP base station.

Beginning at a start block 602 of FIG. 6A, the 3GPP base station or controller thereof may maintain an active neighbor list of small cell frequencies of active neighboring small cells that neighbor a small cell served by the 3GPP base station (step 604 of FIG. 6A). The 3GPP base station may broadcast, to one or more UEs operative in the small cell, a system information message including at least some of the small cell frequencies of the active neighboring small cells in the active neighbor list (step 606 of FIG. 6A). The method may be repeated regularly by the 3GPP base station or its controller. Accordingly, the UE(s) may receive the system information messages, perform measurements on signals from neighboring small cells based on the neighbor lists, and report these measurements to the 3GPP base station which determines whether to handover the UE and to which cell to handover.

In some implementations, in step 606, the system information message which includes the active neighbor list of small cell frequencies may be broadcasted in a system information block (SIB), which may be of SIB type 4

("SIB4") and/or SIB type 5 ("SIB5"). In typical implementations, SIB4 includes intra-frequency neighbors (i.e. on the same frequency) and SIB5 includes inter-frequency neighbors (i.e. on a different frequency). Also, as a single small cell may be associated with a plurality of PLMNs or MNOs, a system information message may further include a list of PLMN IDs associated with the multiple PLMNs in a SIB type 1 ("SIB1") of the system information message. In some implementations, in step 606, small cell frequencies in the active neighbor list may alternatively be transmitted in a message which is an RRC connection reconfiguration message, a message which configures UE measurement reporting. The message could also be or be referred to as a measurement control message or measurement request message.

Figure 6B:
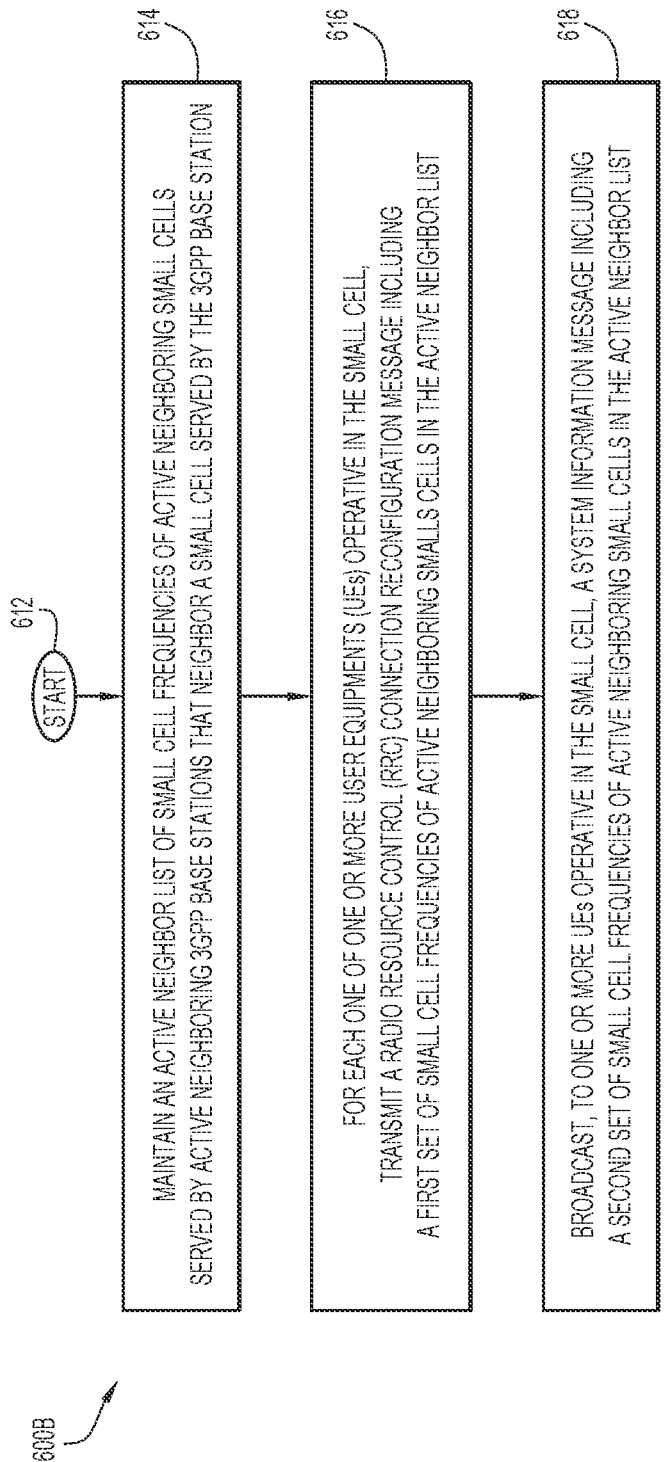

FIG. 6B is a flowchart 600B for describing a method of a base station for providing small cell frequencies of active neighboring small cells to UEs according to some implementations of the present disclosure. The method of FIG. 6B may be especially suitable for providing small cell frequencies of active neighboring small cells to UEs when a large number of active neighboring cells are known to exist. The method of FIG. 6B may be performed by a 3GPP base station (or controller or control unit thereof) operative in a shared spectrum according to a system for shared spectrum access. The method may be performed by each one of the 3GPP base stations in the mobile network. In some implementations, the base station may be a CBSD operative in a shared spectrum according to a SAS. The method may be embodied in a computer program product which includes a non-transitory computer readable medium and instructions stored in the non-transitory computer readable medium, where the instructions are executable by one or more controllers or processors of the 3GPP base station.

Beginning at a start block 612 of FIG. 6B, the 3GPP base station or controller thereof may maintain an active neighbor list of small cell frequencies of active neighboring small cells that neighbor a small cell served by the 3GPP base station (step 614 of FIG. 6B). The 3GPP base station may transmit, to each of one or more UEs operative in the small cell, an RRC connection reconfiguration message (or other measurement control message or measurement request message) including a first set of small cell frequencies of active neighboring small cells in the active neighbor list (step 616 of FIG. 6B). At step 618 in FIG. 6B, the 3GPP base station or controller thereof may additionally broadcast, to one or more UEs operative in the small cell, a system information message including a second set of small cell frequencies of active neighboring small cells in the active neighbor list. The method may be repeated regularly by the 3GPP base station or its controller.

In FIG. 6B, the first set of small cell frequencies from the active neighbor list are different from the second set of small cell frequencies from the active neighbor list. In some implementations, the first set of small cell frequencies may be associated with a set of stronger measurements than the second set of small cell frequencies. The UE(s) may receive the measurement control messages and system information messages, perform measurements on signals from active neighboring small cells based on the active neighbor lists, and report these measurements to the 3GPP base station which determines whether to handover the UE and to which cell to handover. In some implementations, the UE may firstly (i.e. initially) perform measurements with use of the first set of small cell frequencies, and secondly (i.e. subsequently) perform (any necessary) measurements with use of the second set of small cell frequencies.

In some implementations, the RRC connection reconfiguration message for a UE may be sent to a UE in response to detection of a predetermined event. In LTE, a plurality of predefined measurement reporting events are defined; in particular, five (5) intra-system measurement reporting events and two (2) inter-system measurement reporting events are defined. The intra-system measurement reporting events may include events A1, A2, A3, A4, and A5 which are based on Reference Signal Received Power (RSRP) or Reference Signal Received Quality (RSRQ) messages. In particular, an event A5 is triggered when a serving cell of the UE becomes worse than a first threshold value and a neighboring cell becomes better than a second threshold value. In particular implementations, the RRC connection reconfiguration message of step 616 may be sent to a UE in response to detection of a predetermined event which is an event A5.

Figure 7A:
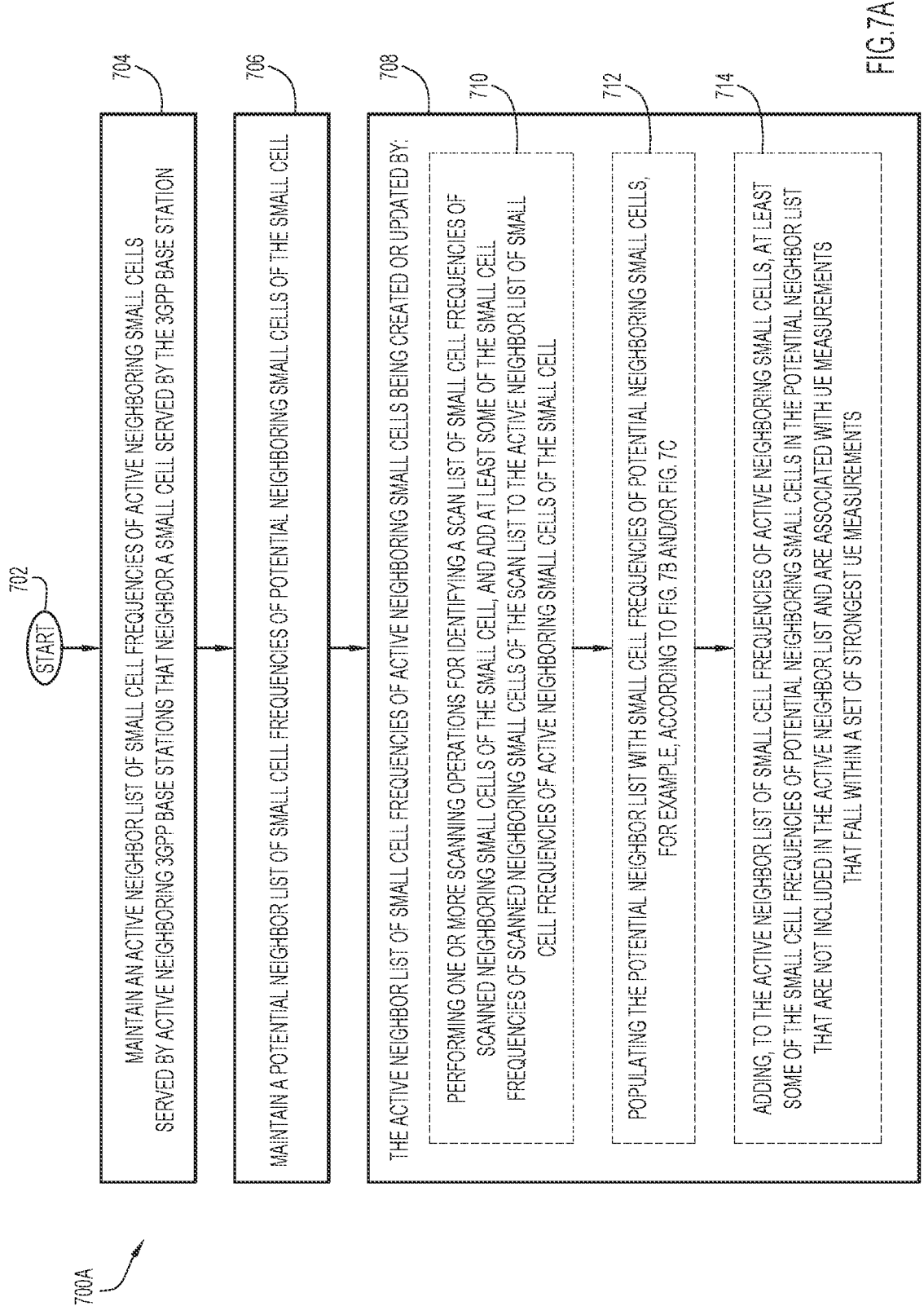
FIGS. 7A-7C are flowcharts for describing methods of a 3GPP base station for use in automated neighbor frequency provisioning according to some implementations of the present disclosure.

FIG. 7A is a flowchart 700A for describing a method of a base station for use in automated neighbor frequency provisioning according to some implementations of the present disclosure. The method of FIG. 7A may be performed by a 3GPP base station (or controller or control unit thereof) operative in a shared spectrum according to a system for shared spectrum access. The method may be performed by each one of the 3GPP base stations in the mobile network. In some implementations, the base station may be a CBSD operative in a shared spectrum according to a SAS. The method may be embodied in a computer program product which includes a non-transitory computer readable medium and instructions stored in the non-transitory computer readable medium, where the instructions are executable by one or more controllers or processors of the 3GPP base station.

Beginning at a start block 702 of FIG. 7A, the 3GPP base station or controller thereof may maintain an active neighbor list of small cell frequencies of active neighboring small cells that neighbor a small cell served by the 3GPP base station (step 704 of FIG. 7A). The 3GPP base station or controller thereof may further maintain a potential neighbor list of small cell frequencies of "likely" potential neighboring small cells of the small cell (step 706 of FIG. 7A).

In some implementations, the active neighbor list of small cell frequencies of active neighboring small cells may be created and/or updated by performing a procedure 708 of FIG. 7A. In the procedure 708 of FIG. 7A, the 3GPP base station or controller thereof may perform one or more scanning operations in one or more RF bands for generating a scan list of small cell frequencies of scanned neighboring small cells of the small cell, and add at least some of the small cell frequencies of the scanned neighboring small cells of the scan list to the active neighbor list of small cell frequencies of active neighboring small cells of the small cell (step 710 of FIG. 7A).

The 3GPP base station or controller thereof may populate the potential neighbor list with small cell frequencies of potential neighboring small cells (step 712 of FIG. 7A). For example, the 3GPP base station or controller thereof may populate the potential neighbor list with small cell frequencies of potential neighboring small cells with use of the methods described in relation to FIG. 7B (e.g. X2 neighbors' neighbors), FIG. 7C (e.g. for new serving cells of reconnected UEs responsive to RLFs), or both.

The 3GPP base station or controller thereof may add, to the active neighbor list of small cell frequencies of active neighboring small cells, at least some of the small cell frequencies of the potential neighboring small cells in the potential neighbor list that are not included in the active neighbor list and are associated with UE measurements that fall within a set of strongest UE measurements (step 714 of FIG. 7A). For obtaining UE measurements, the 3GPP base station may transmit, to one or more UEs operative in the small cell, a message including at least some of the small cell frequencies of the potential neighboring small cells in the potential neighbor list, and in response, receiving a message including a report of the UE measurements of the potential neighboring small cells. UE measurements may be compared to one or more threshold values (whether fixed or relative/variable threshold values). The method of FIG. 7A may be performed regularly, periodically, or in response to a change in channel assignment according to the system for shared spectrum access.

Figure 7B:
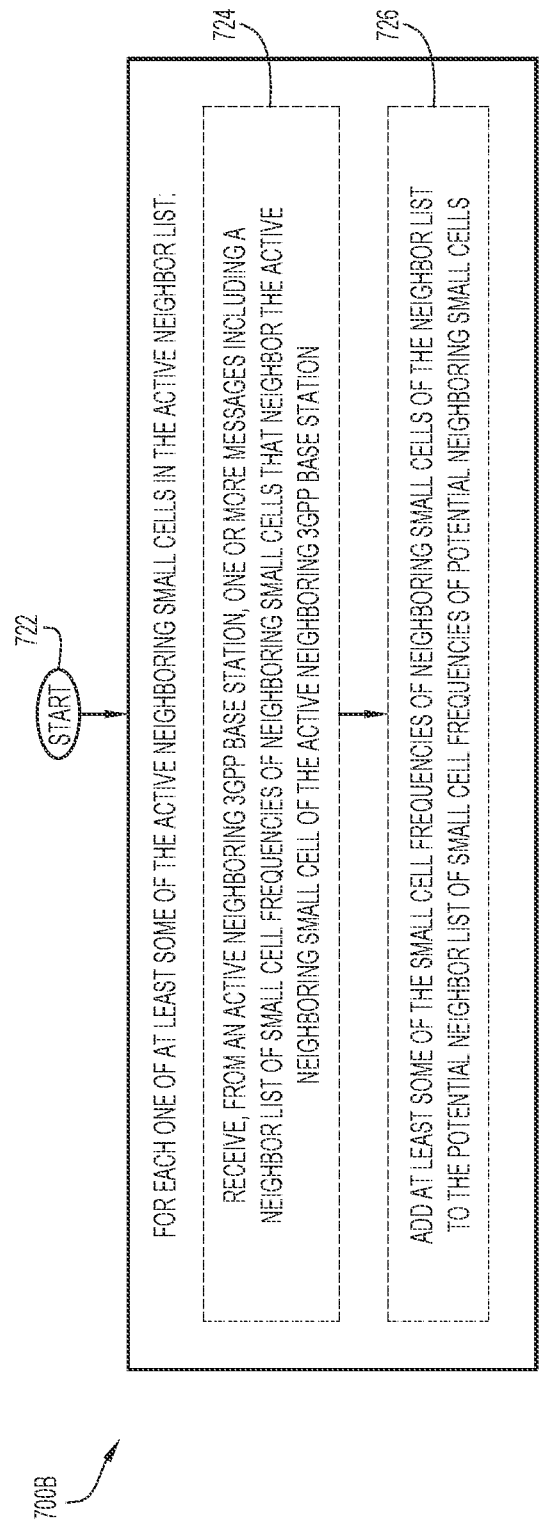

FIG. 7B is a flowchart 700B for describing a method of a base station for use in automated neighbor frequency provisioning according to some implementations of the present disclosure (e.g. for X2 neighbors' neighbors). The method of FIG. 7B may be performed by a 3GPP base station (or controller or control unit thereof) operative in a shared spectrum according to a system for shared spectrum access. The method may be performed by each one of the 3GPP base stations in the mobile network. In some implementations, the base station may be a CBSD operative in a shared spectrum according to a SAS. The method may be embodied in a computer program product which includes a non-transitory computer readable medium and instructions stored in the non-transitory computer readable medium, where the instructions are executable by one or more controllers or processors of the 3GPP base station.

Beginning at a start block 722 of FIG. 7B, the 3GPP base station or controller thereof may perform the following steps for each one of at least some of the active neighboring small cells in the active neighbor list. The 3GPP base station or controller may receive, from an active neighboring 3GPP base station having a connection established with the 3GPP base station, one or more messages including a neighbor list of small cell frequencies of neighboring small cells that neighbor the active neighboring small cell of the active neighboring 3GPP base station (step 724 of FIG. 7B). The 3GPP base station or controller may then add at least some of the small cell frequencies of the neighboring small cells of the neighbor list of the active neighboring 3GPP base station to the potential neighbor list of small cell frequencies of potential neighboring small cells of the 3GPP base station (step 726 of FIG. 7B).

As the potential neighbor list has now been populated (as per step 712 of FIG. 7A), step 714 of FIG. 7A which may be regularly or periodically performed will apply. That is, the 3GPP base station or controller thereof may add, to the active neighbor list of small cell frequencies of active neighboring small cells, at least some of the small cell frequencies of the potential neighboring small cells in the potential neighbor list that are not included in the active neighbor list and are associated with UE measurements that fall within a set of strongest UE measurements (with reference back to step 714 of FIG. 7A).

Figure 7C:
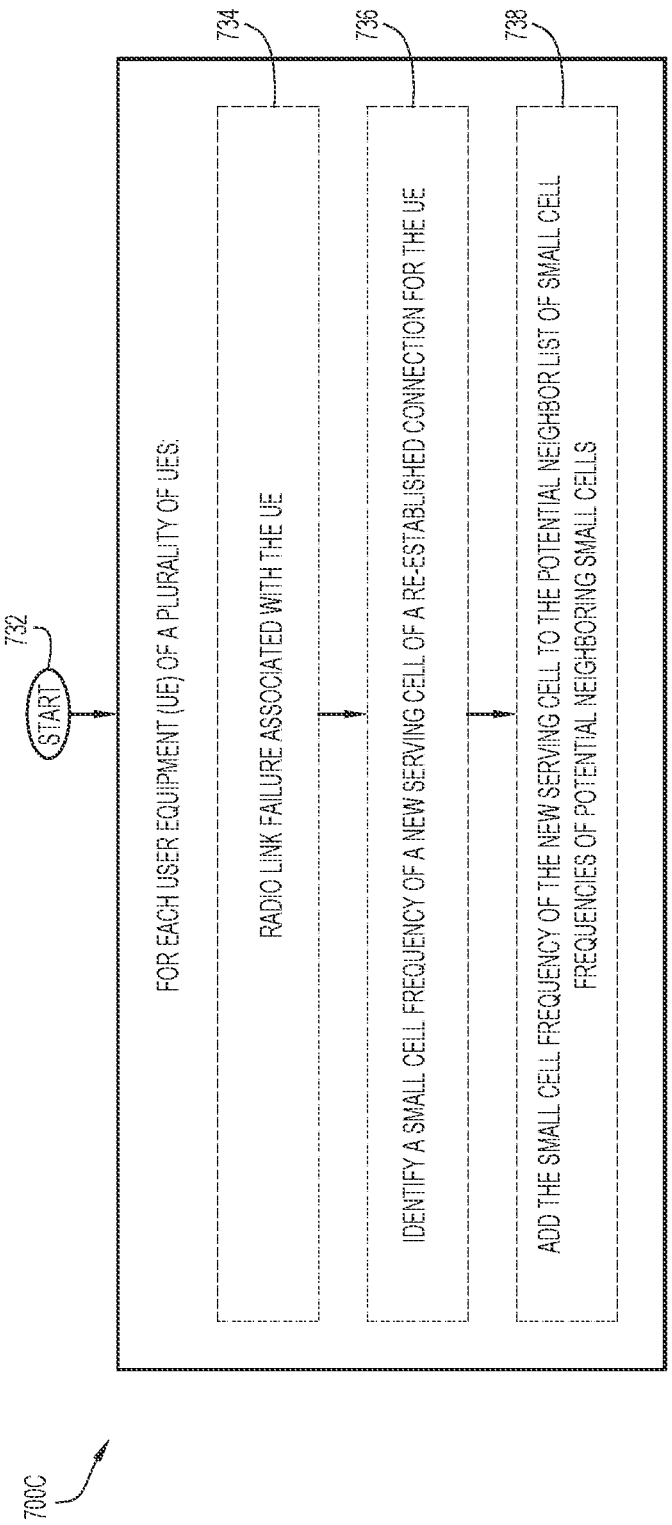

FIG. 7C is a flowchart 700C for describing a method of a base station for use in automated neighbor frequency provisioning according to some implementations of the present disclosure (e.g. for new serving cells of reconnected UEs responsive to RLFs). The method of FIG. 7C may be performed by a 3GPP base station (or controller or control unit thereof) operative in a shared spectrum according to a system for shared spectrum access. The method may be performed by each one of the 3GPP base stations in the mobile network. In some implementations, the base station may be a CBSD operative in a shared spectrum according to a SAS. The method may be embodied in a computer program product which includes a non-transitory computer readable medium and instructions stored in the non-transitory computer readable medium, where the instructions are executable by one or more controllers or processors of the 3GPP base station.

Beginning at a start block 732 of FIG. 7C, the 3GPP base station or controller thereof may perform the following steps for each UE of a plurality of UEs experiencing an RLF. A radio link failure associated with a UE may be detected (step 734 of FIG. 7C). The 3GPP base station or controller may identify a small cell frequency of a new serving cell of a re-established connection for the UE (step 736 of FIG. 7C). The 3GPP base station or controller may add the small cell frequency of the new serving cell to the potential neighbor list of small cell frequencies of potential neighboring small cells of the small cell (step 738 of FIG. 7C).

As the potential neighbor list has again been populated (as per step 712 of FIG. 7A), step 714 of FIG. 7A which may be regularly or periodically performed will apply. That is, the 3GPP base station or controller thereof may add, to the active neighbor list of small cell frequencies of active neighboring small cells, at least some of the small cell frequencies of the potential neighboring small cells in the potential neighbor list that are not included in the active neighbor list and are associated with UE measurements that fall within a set of strongest UE measurements (with reference back to step 714 of FIG. 7A).

In some implementations, the active neighbor list may be further created or updated based on an RF map of the small cell which may be generated by the 3GPP base station. The RF map of the small cell may be made or constructed from or based on a plurality of RF map portions associated with a plurality of UEs. Here, the 3GPP base station may transmit, to a UE operative in the small cell, a message including at least some of the list of small cell frequencies of potential neighboring small cells. In response, the 3GPP base station may receive a message including a report of UE measurements of the potential neighboring small cells. The 3GPP base station may create a respective one of the RF map portions of the RF map based on the report of the UE measurements of the potential neighboring small cells, as well path loss and other factors, etc. This procedure may be repeated, that is, the transmitting and the creating may be repeated for each UE of the plurality of UEs operative in the small cell. The active neighbor list which has been created or updated in this manner may be used by subsequent UEs operative in the small cell.

Figure 8A:
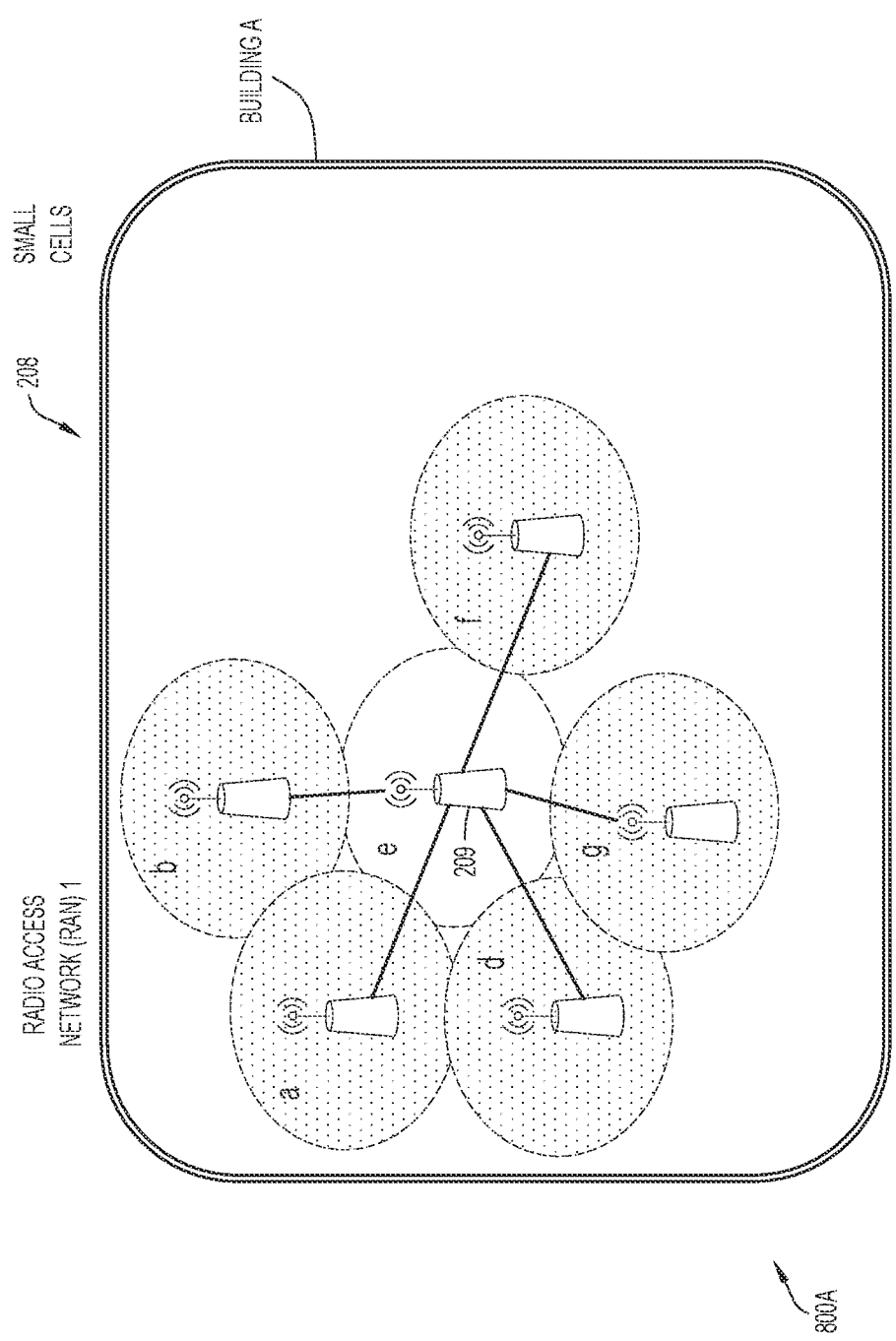
FIGS. 8A-8D are generally top down views of a RAN of the NHN of FIG. 2 for use in illustrating the methods of a 3GPP base station for automated neighbor frequency provisioning according to some implementations of the present disclosure.
Figure 8B:
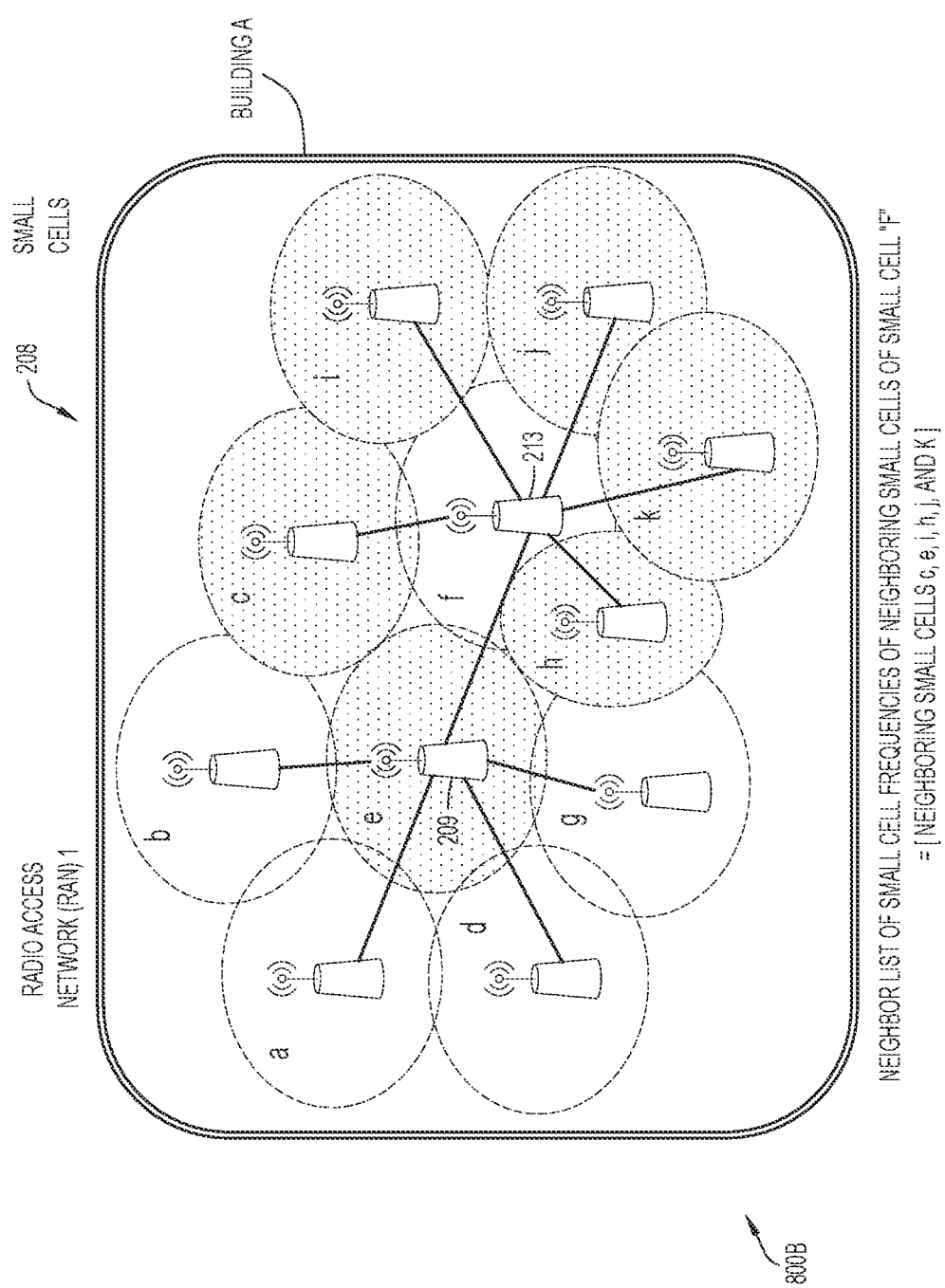
Figure 8C:
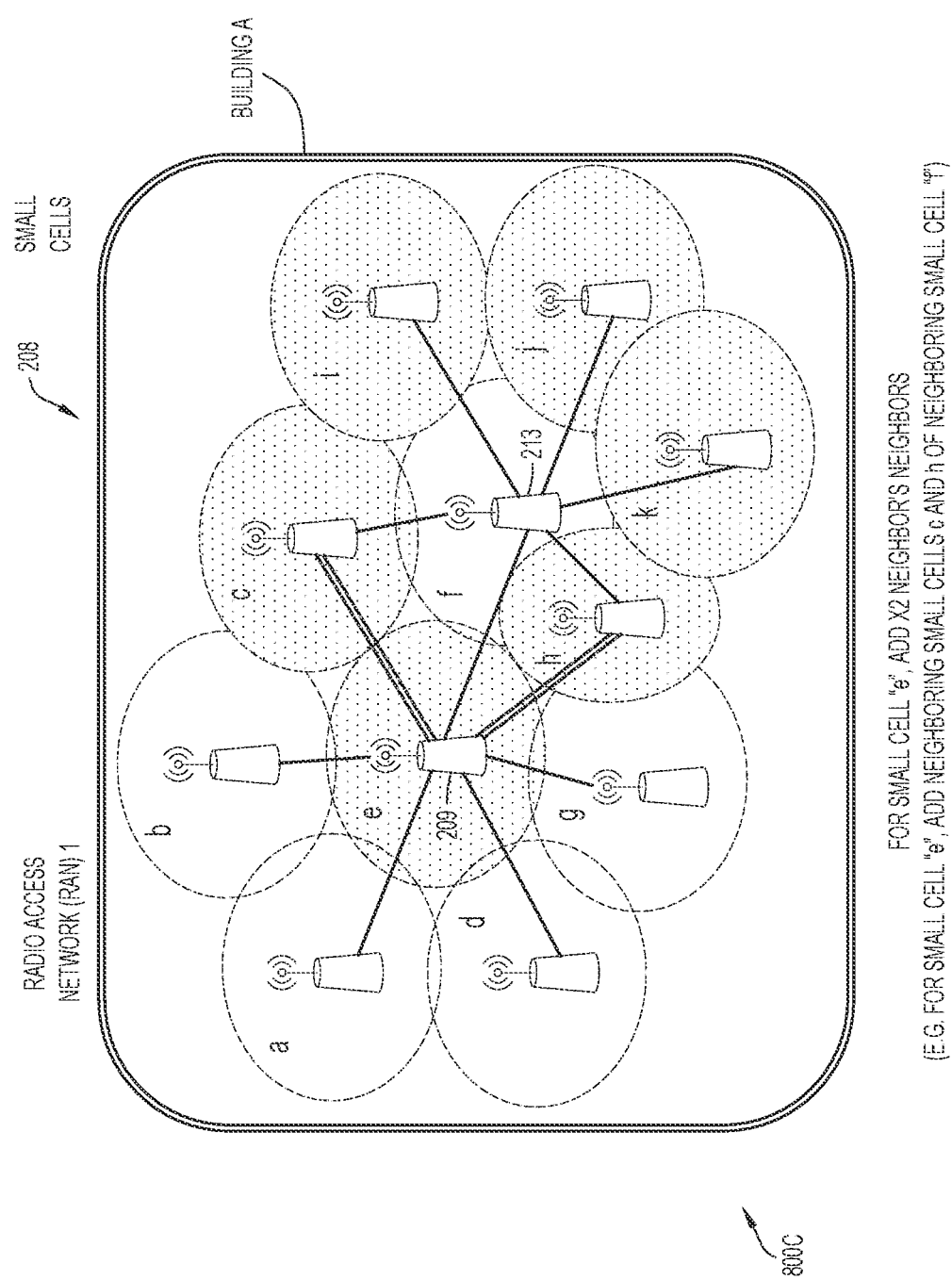
Figure 8D:
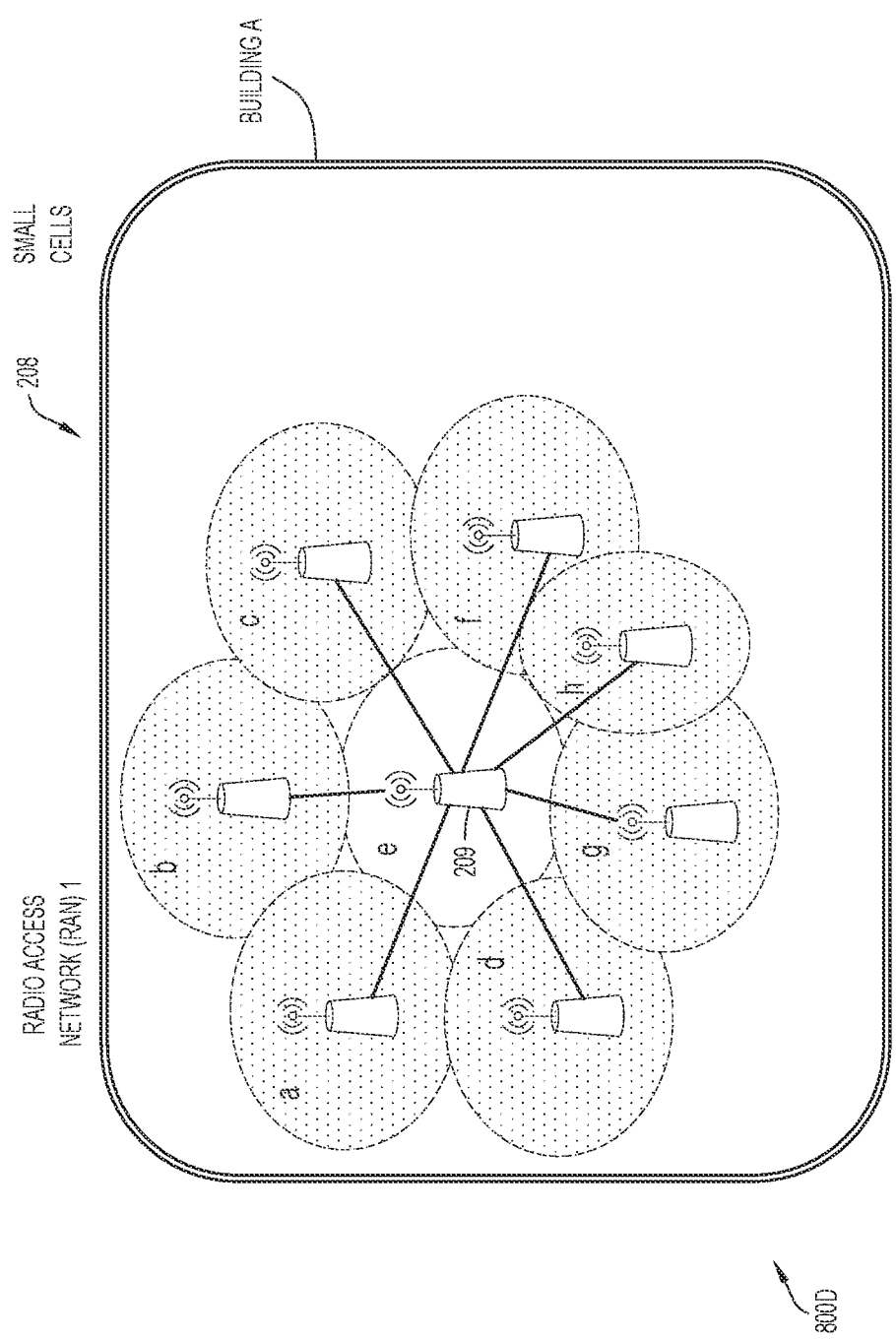

At least some implementations of the present disclosure are better illustrated in relation to FIGS. 8A-8D (e.g. for X2 neighbors' neighbors). More particularly, FIG. 8A is an illustrative representation 800A of a generally top down view of a select relevant portion of the communication system including the RAN 1 of NHN 204 of FIG. 2. RAN 1 of NHN 204 of FIG. 8A illustrates that the plurality of small cells 208 include a small cell "e" served by 3GPP base station 209 and a plurality of neighboring small cells a, b, d, f, and g that neighbor the small cell "e." FIGS. 8B, 8C and 8D illustrate similar representations 800B, 800C and 800D, respectively, as described below.

In FIG. 8A, an active neighbor list of 3GPP base station 209 may be initialized by performing one or more scanning operations in one or more RF bands for generating a scan list of small cell frequencies of "scanned" neighboring small cells of the small cell "e" (see e.g. step 710 of FIG. 7A previously described). At least some of the small cell frequencies of the scanned neighboring small cells of the scan list may be added to the active neighbor list of small cell frequencies of active neighboring small cells. As a result of the network scanning, 3GPP base station 209 has an "initial" active neighbor list of small cell frequencies of (active) neighboring small cells a, b, d, f, and g. 3GPP base station 209 which serves small cell "e" is shown to have established connections or X2 connections with its active neighboring 3GPP base stations in neighboring small cells a, b, d, f, and g.

However, additional neighboring small cells may still exist for the small cell "e" of 3GPP base station 209. With reference now to FIG. 8B, RAN 1 of NHN 204 of FIG. 8B illustrates that the plurality of small cells 208 including small cell "f" further includes neighboring small cells c, e, i, h, j, and k that neighbor the small cell "f." Small cell "f" which is served by an active neighboring 3GPP base station 213 of 3GPP base station 209 is an active neighbor cell of small cell "e." The active neighbor list of active neighboring 3GPP base station 213 may be initialized by performing network scanning, as previously described. As a result of the network scanning, active neighboring 3GPP base station 213 may have an "initial" active neighbor list of small cell frequencies of (active) neighboring small cells c, e, i, h, j, and k. In FIG. 8B, active neighboring 3GPP base station 213 which serves small cell "f" is shown to have established connections or X2 connections with its active neighboring 3GPP base stations in neighboring small cells c, e, i, h, j, and k.

In this example, some of the neighboring small cells c, e, i, h, j, and k of the small cell "f" may be suitable neighbors for small cell "e." For example, neighboring small cells c and h of small cell "f" may be suitable neighbors for small cell "e." To identify these neighbors, 3GPP base station 209 may receive, from its active neighboring 3GPP base station 213, one or more messages including the active neighbor list of small cell frequencies of neighboring small cells of active neighboring 3GPP base station 213 (see e.g. step 724 of FIG. 7B previously described). At least some of the small cell frequencies of the neighboring small cells c, e, i, h, j, and k of small cell "f" served by active neighboring 3GPP base station 213 may be added to the potential neighbor list of small cell frequencies of potential neighboring small cells of 3GPP base station 209. 3GPP base station 209 may add, to its active neighbor list of small cell frequencies of active neighboring small cells, at least some of the small cell frequencies of the potential neighboring small cells in its potential neighbor list that are not included in its active neighbor list and are associated with UE measurements that fall within a set of strongest UE measurements (see e.g. step 714 of FIG. 7A previously described).

Thus, neighboring small cells c and h of the small cell "f" have been detected to be suitable neighbors for small cell "e." With reference now to FIG. 8C, 3GPP base station 209 which serves small cell "e" is shown to have further established connections or X2 connections with newly-deemed, active neighboring 3GPP base stations that serve neighboring small cells c and h. With reference now to FIG. 8D, active neighboring 3GPP base station 209 may have an "updated" active neighbor list of small cell frequencies of (active) neighboring small cells a, b, c, d, f, g, and h. Compare the active neighboring small cells a, b, c, d, f, g, and h of small cell "e" in FIG. 8D with active neighboring small cells a, b, d, f, and g of small cell "e" in FIG. 8A.

Figure 9:
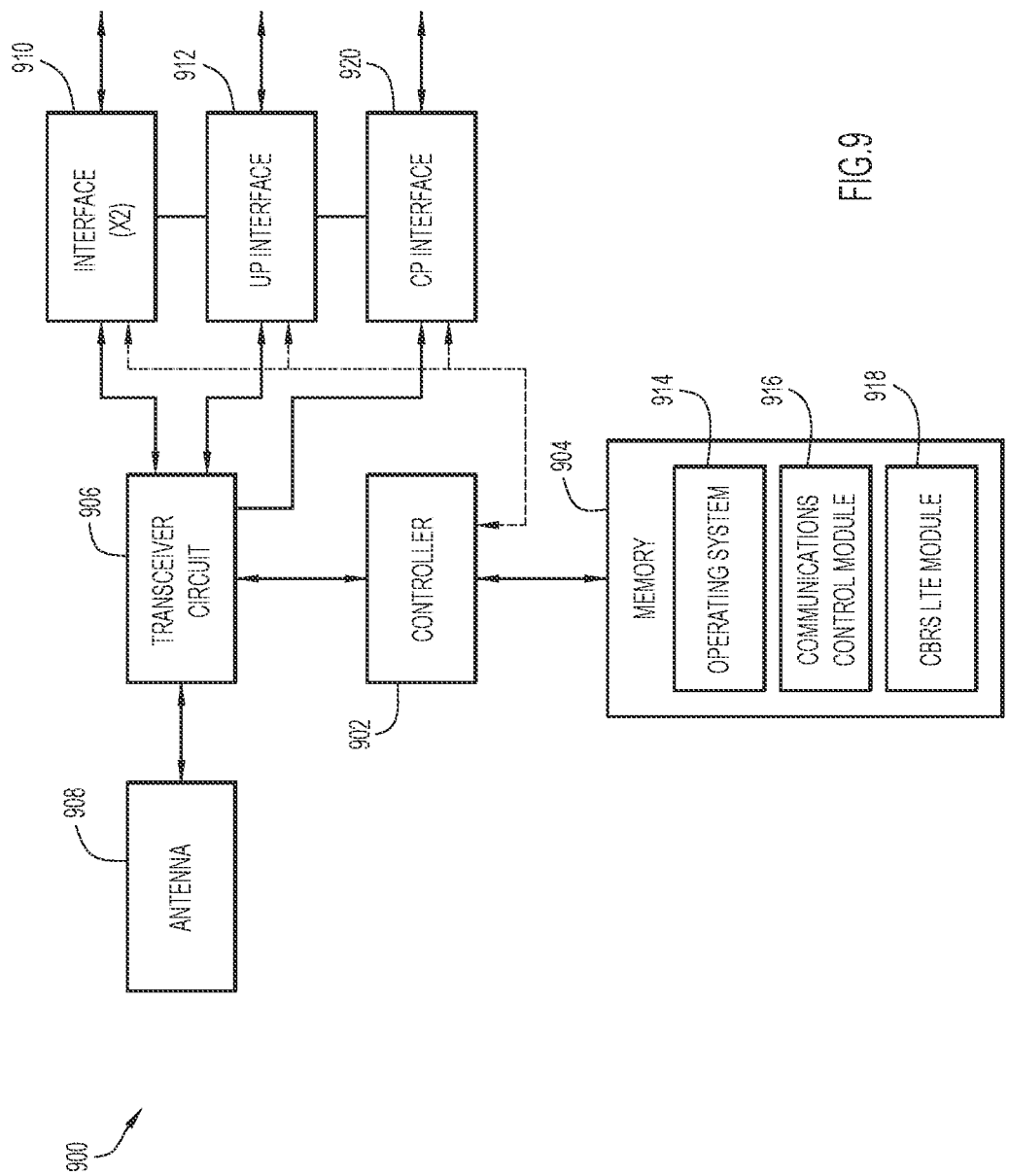
FIG. 9 is a schematic block diagram of relevant components of a base station for automated neighbor frequency provisioning according to some implementations.

Reference is now made to FIG. 9, which shows an example schematic block diagram of components of a (CBRS) 3GPP base station 900 (e.g. an eNB or gNB) or CBSD according to some implementations. As shown, 3GPP base station 900 has a transceiver circuit 906 for transmitting signals to and for receiving signals from the communication devices (such as UEs) via one or more antennas 908. 3GPP base station 900 may also have an interface 910 (e.g. an X2 interface) for transmitting signals to and for receiving signals from other base stations. Further, 3GPP base station 900 may have a user plane (UP) interface 912 for transmitting signals to and for receiving signals from a user plane entity (e.g. a serving gateway-user plane or "SGW-U" or user plane function or "UPF", etc.). Even further, 3GPP base station 900 may have a control plane (CP) interface 920 for transmitting control signaling to and from a control plane function (e.g. a serving gateway-control plane or "SGW-C," etc.).

3GPP base station 900 also has a controller 902 to control the operation of the base station. Controller 902 is associated with a memory 904. 3GPP base station 900 may have all the typical functionality of a CBRS base station, and this may be provided by any one or any combination of hardware, software and firmware, as appropriate. Software may be pre-installed in memory 904 and/or may be downloaded via the network or from a removable data storage device, for example. Controller 902 may be configured to control the overall operation of 3GPP base station 900 by, in this example, program instructions or software instructions stored within memory 904. As shown, these software instructions include, among other things, an operating system 914, a communications control module 916, a CBRS/LTE module 918, and further instructions for use providing the techniques of the present disclosure.

In basic operation, transceiver circuit 906 is configured to provide radio communications with UEs. Communications control module 916 is configured to control the communication between 3GPP base station 900 and UEs and other network entities that are connected to 3GPP base station 900. Communications control module 916 also controls the separate flows of downlink user traffic (via associated data radio bearers) and control data to be transmitted to UEs associated with 3GPP base station 900 including, for example, control data for core network services and/or mobility of UEs. In some implementations, communications control module 916 may include or interface with an ANR function operative in accordance with techniques of the present disclosure. CBRS/LTE module 918 is configured to communicate with compatible devices and network nodes using appropriate CBRS/LTE protocols known in the art.

In some implementations, each of the elements of the system may couple to one another through simple interfaces or through any other suitable connection (wired or wireless), which provides a viable pathway for network communications. As referred to herein, a physical (wired or wireless) interconnection or interface may refer to an interconnection of one element or node with one or more other element(s), while a logical interconnection or interface may refer to communications, interactions and/or operations of elements with each other, which may be directly or indirectly interconnected, in a network environment.

Note that the terms 'data', 'information', 'parameters' and variations thereof as used herein may refer to any type of binary, numeric, voice, video, textual or script data or information or any type of source or object code, or any other suitable data or information in any appropriate format that may be communicated from one point to another in electronic devices and/or networks. Additionally, messages, requests, responses, replies, queries, etc. are forms of network traffic and, therefore, may comprise one or more packets.

Note that in some implementations, operations as outlined herein to facilitate techniques of the present disclosure may be implemented by logic encoded in one or more tangible media, which may be inclusive of non-transitory tangible media and/or non-transitory computer readable storage media (e.g. embedded logic provided in an ASIC, in DSP instructions, software—potentially inclusive of object code and source code—to be executed by a processor, or other similar machine, etc.). In some of these instances, a memory element and/or storage may store data, software, code, instructions (e.g. processor instructions), logic, parameters, combinations thereof or the like used for operations described herein. This includes memory element and/or storage being able to store data, software, code, instructions (e.g. processor instructions), logic, parameters, combinations thereof, or the like that are executed to carry out operations described herein.

A controller or processor (e.g. a hardware processor) may execute any type of instructions associated with data to achieve the operations detailed herein. In one example, a processor may transform an element or an article (e.g. data, information) from one state or thing to another state or thing. In another example, operations outlined herein may be implemented with logic, which may include fixed logic, hardware logic, programmable logic, digital logic, etc. (e.g. software/computer instructions executed by a processor), and/or one or more the elements identified herein could be some type of a programmable processor, programmable digital logic (e.g. a field programmable gate array (FPGA), a DSP processor, an EPROM, a controller, an electrically erasable PROM (EEPROM), or an ASIC) that includes digital logic, software, code, electronic instructions, or any suitable combination thereof.

It is also noted that the operations and steps described with reference to the preceding figures illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, interaction may be described in terms of one, two, three, or four network elements. However, this has been done for purposes of clarity and example only. In certain cases, it may be easier to describe one or more of the functionalities by only referencing a limited number of network elements. It should be appreciated that the system (and its teachings) are readily scalable and may accommodate a large number of components, as well as more complicated/sophisticated arrangements and configurations. Accordingly, the examples provided should not limit the scope or inhibit the broad teachings of the system as potentially applied to a myriad of other architectures.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, interfaces and protocols, the system may be applicable to other exchanges or routing protocols, interfaces, and/or communications standards, proprietary, and/or non-proprietary. Moreover, although the system has been illustrated with reference to particular elements and operations that facilitate the communication process, these elements, and operations may be replaced by any suitable architecture or process that achieves the intended functionality of the system.

Although in some implementations of the present disclosure, one or more (or all) of the components, functions, and/or techniques described in relation to the figures may be employed together for operation in a cooperative manner, each one of the components, functions, and/or techniques may indeed be employed separately and individually, to facilitate or provide one or more advantages of the present disclosure.

It will also be understood that, although the terms "first," "second," etc. may be used herein to describe various elements, these elements should not be limited by these terms. These terms are used to distinguish one element from another. For example, a first neighbor list could be termed a second neighbor list, and similarly, a second neighbor list could be termed a first neighbor list, without changing the meaning of the description, so long as all occurrences of the "first neighbor list" are renamed consistently and all occurrences of the "second neighbor list" are renamed consistently. The first neighbor list and the second neighbor list are both neighbor lists, but they are not the same neighbor list.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method for a Third Generation Partnership Project (3GPP) base station operative in a shared spectrum according to a system for shared spectrum access, the method comprising:

maintaining an active neighbor list of small cell frequencies of active neighboring small cells that neighbor a small cell served by the 3GPP base station;
maintaining a potential neighbor list of small cell frequencies of potential neighboring small cells of the small cell of the 3GPP base station;
wherein the active neighbor list of small cell frequencies of active neighboring small cells is created or updated by:
performing one or more scanning operations for generating a scan list of small cell frequencies of scanned neighboring small cells of the small cell, and adding at least some of the small cell frequencies of the scanned neighboring small cells of the scan list to the active neighbor list of small cell frequencies of active neighboring small cells of the small cell;
for each one of at least some of the active neighboring small cells in the active neighbor list: receiving, from an active neighboring 3GPP base station having a connection established with the 3GPP base station, one or more messages including a neighbor list of small cell frequencies of neighboring small cells that neighbor the active neighboring small cell of the active neighboring 3GPP base station; and adding at least some of the small cell frequencies of the neighboring small cells of the neighbor list of the active neighboring 3GPP base station to the potential neighbor list; and
adding, to the active neighbor list of small cell frequencies of active neighboring small cells, at least some of the small cell frequencies of the potential neighboring small cells in the potential neighbor list that are not included in the active neighbor list and are associated with user equipment (UE) measurements of small cell frequencies of potential neighboring small cells that fall within a set of strongest UE measurements.

2. The method of claim 1, further comprising:
broadcasting, to one or more UEs operative in the small cell, a system information message including at least some of the small cell frequencies of the active neighboring small cells in the active neighbor list.

3. The method of claim 1, further comprising:
transmitting, to one or more UEs operative in the small cell, a message including at least some of the small cell frequencies of the potential neighboring small cells in the potential neighbor list, and in response, receiving a message including a report of the UE measurements of small cell frequencies of potential neighboring small cells.

4. The method of claim 1, further comprising:
for each one of the at least some of the active neighboring small cells in the active neighbor list, establishing an X2 connection with the active neighboring 3GPP base station associated with the active neighboring small cell.

5. The method of claim 1, further comprising:
transmitting, to one or more first UEs operative in the small cell, a radio resource control (RRC) connection reconfiguration message including a first set of small cell frequencies of active neighboring small cells in the active neighbor list; and
broadcasting, to one or more second UEs operative in the small cell, a system information message including a second set of small cell frequencies of active neighboring small cells in the active neighbor list.

6. The method of claim 1, wherein the active neighbor list of small cell frequencies of active neighboring small cells is created or updated further by:
for each one of a plurality of UEs:
after a radio link failure associated with a UE, identifying a small cell frequency of a new serving cell of a re-established connection for the UE; and
adding the small cell frequency of the new serving cell to the potential neighbor list of small cell frequencies of potential neighboring small cells of the small cell.

7. The method of claim 1, wherein the active neighbor list of small cell frequencies of active neighboring small cells is further created or updated based on a radio frequency (RF) map of the small cell, the RF map comprising a plurality of RF map portions and being created by:
transmitting, to a UE operative in the small cell, a message including at least some of the list of small cell frequencies of potential neighboring small cells, and in response, receiving a message including a report of the UE measurements of small cell frequencies of potential neighboring small cells;
creating a respective one of the RF map portions of the RF map based on the report of the UE measurements of small cell frequencies of potential neighboring small cells; and
repeating the transmitting and the creating for each one of a plurality of UEs operative in the small cell.

8. The method of claim 1, wherein:
the active neighbor list of small cell frequencies of active neighboring small cells are associated with a neighbor relation table (NRT) of the 3GPP base station,
the neighbor list of small cell frequencies of neighboring small cells are associated with a neighboring NRT of the active neighboring 3GPP base station, and
the active neighbor list of small cell frequencies includes one or more of a physical cell identifier (PCI), a cell global identifier (CGI), or an Evolved-Universal Mobile Telecommunications Service (UMTS) Terrestrial Radio Access Network (E-UTRAN) CGI (eCGI).

9. A Third Generation Partnership Project (3GPP) base station operative in a shared spectrum according to a system for shared spectrum access, the 3GPP base station comprising:
a controller;
a transceiver circuit configured to provide radio communications;
the controller being configured to maintain an active neighbor list of small cell frequencies of active neighboring small cells that neighbor a small cell served by the 3GPP base station, and to maintain a potential neighbor list of small cell frequencies of potential neighboring small cells of the small cell of the 3GPP base station, wherein the active neighbor list of small cell frequencies of active neighboring small cells is created or updated by:
performing one or more scanning operations for generating a scan list of small cell frequencies of scanned neighboring small cells of the small cell, and adding at least some of the small cell frequencies of the scanned neighboring small cells of the scan list to the active neighbor list of small cell frequencies of active neighboring small cells of the small cell;
for each one of at least some of the active neighboring small cells in the active neighbor list: receiving, from an active neighboring 3GPP base station having a connection established therewith, one or more messages including a neighbor list of small cell frequencies of neighboring small cells that neighbor the active neighboring small cell of the active neighboring 3GPP base station; and adding at least some of the small cell frequencies of the neighboring small cells of the neighbor list of the active neighboring 3GPP base station to the potential neighbor list; and adding, to the active neighbor list of small cell frequencies of active neighboring small cells, at least some of the small cell frequencies of the potential neighboring small cells in the potential neighbor list that are not included in the active neighbor list and are associated with user equipment (UE) measurements of small cell frequencies of potential neighboring small cells that fall within a set of strongest UE measurements.

10. The 3GPP base station of claim 9, wherein the controller is further configured to:

broadcast, via the transceiver circuit to one or more UEs operative in the small cell, a system information message including at least some of the small cell frequencies of the active neighboring small cells in the active neighbor list.

11. The 3GPP base station of claim 9, wherein the controller is further configured to:

transmit, via the transceiver circuit to one or more UEs operative in the small cell, a message including at least some of the small cell frequencies of the potential neighboring small cells in the potential neighbor list, and in response, receive a message including a report of the UE measurements of small cell frequencies of potential neighboring small cells.

12. The 3GPP base station of claim 9, wherein the controller is further configured to:

for each one of the at least some of the active neighboring small cells in the active neighbor list, establish an X2 connection with the active neighboring 3GPP base station associated with the active neighboring small cell.

13. The 3GPP base station of claim 9, wherein the controller is further configured to:

transmit, via the transceiver circuit to one or more first UEs operative in the small cell, a radio resource control (RRC) connection reconfiguration message including a first set of small cell frequencies of active neighboring small cells in the active neighbor list; and broadcast, via the transceiver circuit to one or more second UEs operative in the small cell, a system information message including a second set of small cell frequencies of active neighboring small cells in the active neighbor list.

14. The 3GPP base station of claim 9, wherein the controller is further configured to create or update the active neighbor list of small cell frequencies of active neighboring small cells by being further configured to:

for each one of a plurality of UEs:
after a radio link failure associated with a UE, identify a small cell frequency of a new serving cell of a re-established connection for the UE; and
add the small cell frequency of the new serving cell to the potential neighbor list of small cell frequencies of potential neighboring small cells of the small cell.

15. The 3GPP base station of claim 9, wherein the controller is further configured to create or update the active neighbor list of small cell frequencies of active neighboring small cells based on a radio frequency (RF) map of the small cell, by being further configured to:

transmit, via the transceiver circuit to a UE operative in the small cell, a message including at least some of the list of the small cell frequencies of the potential neighboring small cells, and in response, receiving a message including a report of the UE measurements of small cell frequencies of potential neighboring small cells;

create a respective one of a plurality of RF map portions of the RF map based on the report of the UE measurements of small cell frequencies of potential neighboring small cells; and repeat the transmitting and the creating for each one of a plurality of UEs operative in the small cell.

16. The 3GPP base station of claim 9, which comprises a Citizens Broadband Radio Service Device (CBSD) operative in a shared spectrum.

17. A computer program product comprising:

a non-transitory computer readable medium;

instructions stored in the non-transitory computer readable medium, the instructions being executable by one or more processors of a Third Generation Partnership Project (3GPP) base station or controller thereof for:

maintaining an active neighbor list of small cell frequencies of active neighboring small cells that neighbor a small cell served by the 3GPP base station;

maintaining a potential neighbor list of small cell frequencies of potential neighboring small cells of the small cell of the 3GPP base station;

wherein the active neighbor list of small cell frequencies of active neighboring small cells is created or updated by:

performing one or more scanning operations for generating a scan list of small cell frequencies of scanned neighboring small cells of the small cell, and adding at least some of the small cell frequencies of the scanned neighboring small cells of the scan list to the active neighbor list of small cell frequencies of active neighboring small cells of the small cell;

for each one of at least some of the active neighboring small cells in the active neighbor list: receiving, from an active neighboring 3GPP base station having a connection established therewith, one or more messages including a neighbor list of small cell frequencies of neighboring small cells that neighbor the active neighboring small cell of the active neighboring 3GPP base station, and adding at least some of the small cell frequencies of the neighboring small cells of the neighbor list of the active neighboring 3GPP base station to the potential neighbor list; and adding, to the active neighbor list of small cell frequencies of active neighboring small cells, at least some of the small cell frequencies of the potential neighboring small cells in the potential neighbor list that are not included in the active neighbor list and are associated with user equipment (UE) measurements of small cell frequencies of potential neighboring small cells that fall within a set of strongest UE measurements.

18. The computer program product of claim 17, wherein the instructions are executable by the one or more processors of the 3GPP base station or controller thereof further for:

broadcasting, to one or more UEs operative in the small cell, a system information message including at least some of the small cell frequencies of the active neighboring small cells in the active neighbor list.

19. The computer program product of claim 17, wherein the instructions are executable by the one or more processors of the 3GPP base station or controller thereof further for:

- transmitting, to one or more first UEs operative in the small cell, a radio resource control (RRC) connection reconfiguration message including a first set of small cell frequencies of active neighboring small cells in the active neighbor list; and
- broadcasting, to one or more second UEs operative in the small cell, a system information message including a second set of small cell frequencies of active neighboring small cells in the active neighbor list.

20. The computer program product of claim 17, wherein the instructions are executable by the one or more processors of the 3GPP base station or controller thereof further for creating or updating the active neighbor list of small cell frequencies of active neighboring small cells by:

- for each one of a plurality of UEs:
  - after a radio link failure associated with a UE, identifying a small cell frequency of a new serving cell of a re-established connection for the UE; and
  - adding the small cell frequency of the new serving cell to the potential neighbor list of small cell frequencies of potential neighboring small cells of the small cell.

\* \* \* \* \*